(12) United States Patent
Kim et al.

(10) Patent No.: US 12,360,640 B2
(45) Date of Patent: Jul. 15, 2025

(54) SENSOR DEVICE AND DISPLAY DEVICE COMPRISING THE SAME

(71) Applicant: Samsung Display Co., LTD., Yongin-si (KR)

(72) Inventors: Ji Woong Kim, Yongin-si (KR); Hyung Gun Ma, Yongin-si (KR); Kyung Tea Park, Yongin-si (KR); Seong Joo Lee, Yongin-si (KR); Keum Dong Jung, Yongin-si (KR); Sang Hyun Heo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 478 days.

(21) Appl. No.: 17/702,268

(22) Filed: Mar. 23, 2022

(65) Prior Publication Data

US 2023/0072385 A1    Mar. 9, 2023

(30) Foreign Application Priority Data

Sep. 8, 2021  (KR) .......................... 10-2021-0119911

(51) Int. Cl.
  *G06F 3/044*  (2006.01)
  *G06F 3/041*  (2006.01)
  *G09G 3/32*   (2016.01)

(52) U.S. Cl.
  CPC ........ *G06F 3/0446* (2019.05); *G06F 3/04166* (2019.05); *G09G 3/32* (2013.01); *G06F 2203/04111* (2013.01); *G09G 2310/027* (2013.01); *G09G 2310/08* (2013.01)

(58) Field of Classification Search
  None
  See application file for complete search history.

(56) References Cited

U.S. PATENT DOCUMENTS

| | | | |
|---|---|---|---|
| 9,323,381 B2 | 4/2016 | Lim et al. | |
| 9,348,472 B2 | 5/2016 | Kang et al. | |
| 10,599,264 B2 | 3/2020 | Park et al. | |
| 10,976,862 B2 | 4/2021 | Choi | |
| 2011/0042152 A1* | 2/2011 | Wu | G06F 3/04166 345/173 |
| 2011/0063227 A1* | 3/2011 | Wu | G06F 3/04166 345/173 |
| 2014/0240278 A1* | 8/2014 | Kim | H03F 1/14 330/252 |

(Continued)

FOREIGN PATENT DOCUMENTS

| | | |
|---|---|---|
| KR | 10-2017-0078494 | 7/2017 |
| KR | 10-2019-0048151 | 5/2019 |

*Primary Examiner* — Krishna P Neupane
(74) *Attorney, Agent, or Firm* — KILE PARK REED & HOUTTEMAN PLLC

(57) ABSTRACT

A sensor device includes first sensors; second sensors and the first sensors of mutual capacitance; a sensor transmitter electrically connected to the first sensors, the sensor transmitter supplying driving signals to the first sensors; a sensor receiver electrically connected to the second sensors, the sensor receiver receiving sensing signals from the second sensors, the sensor receiver demodulating the sensing signals by using demodulation clock signals; and a signal generator generating a basic clock signal, and generating the driving signals and the demodulation clock signals to be synchronized with the basic clock signal.

20 Claims, 18 Drawing Sheets

(56) References Cited

U.S. PATENT DOCUMENTS

2017/0108987 A1* 4/2017 Park ................. G06F 3/0418
2017/0185218 A1   6/2017 Lee et al.
2021/0191555 A1   6/2021 Jo et al.
2021/0397323 A1* 12/2021 Ye ................... G06F 3/04166

* cited by examiner

SENSOR DEVICE AND DISPLAY DEVICE COMPRISING THE SAME

CROSS-REFERENCE TO RELATED APPLICATION(S)

This application claims priority to and benefits of Korean patent application 10-2021-0119911 under 35 U.S.C. § 119 filed on Sep. 8, 2021 in the Korean Intellectual Property Office, the entire contents of which are incorporated herein by reference.

BACKGROUND

1. Technical Field

The disclosure generally relates to a sensor device and a display device comprising the same.

2. Description of the Related Art

With the development of information technologies, the importance of a display device which is a connection medium between a user and information increases. Accordingly, display devices such as a liquid crystal display device and an organic light emitting display device are increasingly used.

A display device may include a display unit for displaying an image and a sensor unit for sensing an input of a user. A sensor driver may receive control signals including a clock signal from a display driver to determine an operation timing of the sensor unit. The sensor driver is to additionally go through a synchronization process of a clock signal provided from the outside, and therefore, an additional logic circuit is necessary.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a sensor device and a display device comprising the same, in which an internal clock signal is used, so that any additional logic circuit necessary for synchronization is unnecessary.

A sensor device may include first sensors; second sensors and the first sensors of mutual capacitance; a sensor transmitter electrically connected to the first sensors, the sensor transmitter supplying driving signals to the first sensors; a sensor receiver electrically connected to the second sensors, the sensor receiver receiving sensing signals from the second sensors, the sensor receiver demodulating the sensing signals by using demodulation clock signals; and a signal generator generating a basic clock signal, and generating the driving signals and the demodulation clock signals to be synchronized with the basic clock signal.

The driving signals may include a first driving signal and a second driving signal of a frequency equal to a frequency of the first driving signal and of a phase different from a phase of the first driving signal.

The signal generator may include a basic clock generator generating the basic clock signal; a start signal generator generating a start signal to be synchronized with the basic clock signal and an external enable signal; a timing signal generator sequentially generating timing signals to be synchronized with the basic clock signal and the start signal; a first digital-analog converter generating the first driving signal, based on the timing signals; and a second digital-analog converter generating the second driving signal, based on the timing signals.

The basic clock generator may include odd-numbered fully differential amplifiers electrically connected in series in a ring structure; and a comparator electrically connected having input terminals respectively electrically connected to output terminals of one of the odd-numbered fully differential amplifiers, and an output terminal providing the basic clock signal.

The start signal generator may include a first flip flop outputting a first logic signal, based on the enable signal and the basic clock signal; a second flip flop outputting a second logic signal, based on the first logic signal and the basic clock signal; and an XOR gate outputting the start signal by using, the first logic signal and the second logic signal as inputs.

The timing signal generator may include flip flops electrically connected in series, the flip flops outputting logic signals as the timing signals; and an OR gate having input terminals receiving the start signal and a logic signal of a last flip flop among the flip flops, and an output terminal electrically connected to an input terminal of a first flip flop among the flip flops.

The first digital-analog converter may include first switches electrically connected in parallel between an output terminal through which the first driving signal is output and a resistor string, the first switches being sequentially turned on according to the timing signals, the second digital-analog converter may include second switches electrically connected in parallel between an output terminal through which the second driving signal is output and a resistor string, the second switches being sequentially turned on according to the timing signals. An order in which the first switches are turned on may be different from an order in which the second switches are turned on.

The signal generator may include a first buffer electrically connected to the output terminal of the first digital-analog converter; a first low pass filter electrically connected to an output terminal of the first buffer; and a first amplifier electrically connected to an output terminal of the first low pass filter.

The signal generator may include a second buffer electrically connected to the output terminal of the second digital-analog converter; a second low pass filter electrically connected to an output terminal of the second buffer; and a second amplifier electrically connected to an output terminal of the second low pass filter.

The demodulation clock signals may include a first demodulation clock signal and a second demodulation clock signal having a phase different by about 90 degrees from a phase of the first demodulation clock signal. The signal generator may include a demodulation clock generator generating the first demodulation clock signal and the second demodulation clock signal to be synchronized with the basic clock signal.

The sensor receiver may include a charge amplifier receiving the sensing signals from two of the second sensors; a band pass filter filtering an output signal of the charge amplifier to have a set frequency band; a first demodulator demodulating an output signal of the band pass filter, based on the first demodulation clock signal; and a second demodulator demodulating the output signal of the band pass filter, based on the second demodulation clock signal.

The sensor receiver may further include a first low pass filter filtering an output signal of the first demodulator to have a set frequency band; and a second low pass filter filtering an output signal of the second demodulator to have a set frequency band.

The set frequency band of the first low pass filter and the set frequency band of the second low pass filter may be lower than the set frequency band of the band pass filter.

The sensor receiver may include a first analog-digital converter converting an output signal of the first low pass filter into a first digital signal; and a second analog-digital converter converting an output signal of the second low pas filter into a second digital signal.

The sensor receiver may include a signal processor determining a final sensing value by adding up a square value of the first digital signal and a square value of the second digital signal.

A display device may include a display unit displaying an image; a sensor unit overlapping the display unit, the sensor unit including first sensors and second sensors of mutual capacitance; a sensor transmitter electrically connected to the first sensors, the sensor transmitter supplying driving signals to the first sensors; a sensor receiver electrically connected to the second sensors, the sensor receiver receiving sensing signals from the second sensors, the sensor receiver demodulating the sensing signals by using demodulation clock signals; a signal generator generating a basic clock signal, and generating the driving signals and the demodulation clock signals to be synchronized with the basic clock signal; and a display driver providing the signal generator with an enable signal allowing generation of the driving signals without the basic clock signal.

The driving signals may include a first driving signal and a second driving signal of a frequency equal to a frequency of the first driving signal and a phase different from a phase of the first driving signal.

The signal generator may include a basic clock generator generating the basic clock signal; a start signal generator generating a start signal to be synchronized with the basic clock signal and an external enable signal; a timing signal generator sequentially generating timing signals to be synchronized with the basic clock signal and the start signal; a first digital-analog converter generating the first driving signal, based on the timing signals; and a second digital-analog converter generating the second driving signal, based on the timing signals.

The demodulation clock signals may include a first demodulation clock signal and a second demodulation clock signal having a phase different by about 90 degrees from a phase of the first demodulation clock signal. The signal generator may include a demodulation clock generator generating the first demodulation clock signal and the second demodulation clock signal to be synchronized with the basic clock signal.

The sensor receiver may include a charge amplifier receiving the sensing signals from two of the second sensors; a band pass filter filtering an output signal of the charge amplifier to have a set frequency band; a first demodulator demodulating an output signal of the band pass filter, based on the first demodulation clock signal; a second demodulator demodulating the output signal of the band pass filter, based on the second demodulation clock signal; a first low pass filter filtering an output signal of the first demodulator to have a set frequency band; a second low pass filter filtering an output signal of the second demodulator to have a set frequency band; a first analog-digital converter converting an output signal of the first low pass filter into a first digital signal; and a second analog-digital converter converting an output signal of the second low pas filter into a second digital signal.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

The above and other aspects and features of the disclosure will become more apparent by describing in detail embodiments thereof with reference to the attached drawings, in which.

DETAILED DESCRIPTION OF THE EMBODIMENTS

Figure 1:
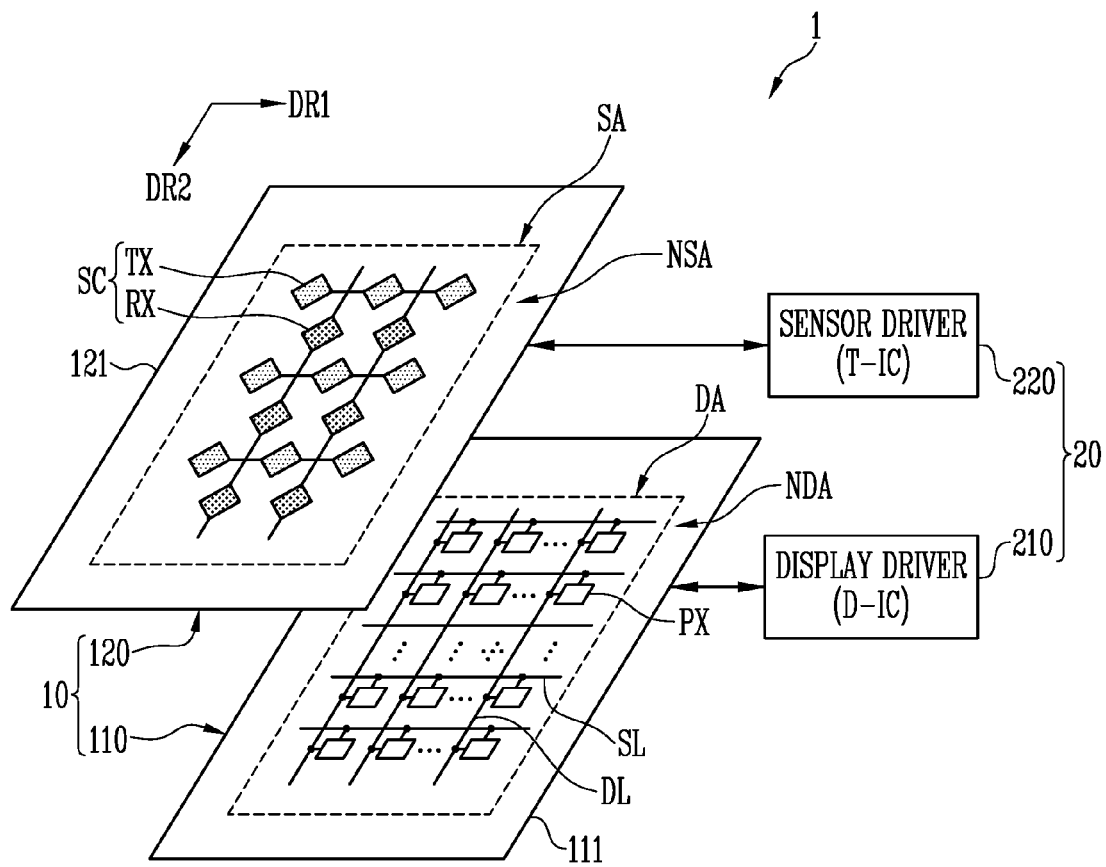
FIGS. 1 and 2 are schematic diagrams illustrating a display device in accordance with an embodiment.

Hereinafter, embodiments are described in detail with reference to the accompanying drawings so that those skilled in the art may readily practice the disclosure. The disclosure may be implemented in various different forms and is not limited to the embodiments described in the specification.

A part irrelevant to the description may be omitted to clearly describe the disclosure, and the same or similar constituent elements will be designated by the same reference numerals throughout the specification. Therefore, the same reference numerals may be used in different drawings to identify the same or similar elements.

The size and thickness of each component illustrated in the drawings are arbitrarily shown for better understanding and ease of description, but the disclosure is not limited thereto. Thicknesses of several portions and regions may be exaggerated for clear expressions.

In description, the expression "equal" may mean "substantially equal." For example, this may mean equality to a degree to which those skilled in the art can understand the equality. Other expressions may be expressions in which "substantially" may be omitted.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of for the purpose of" its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Figure 2:
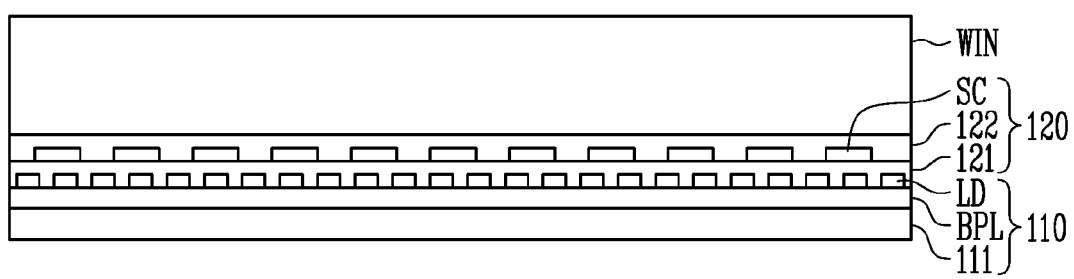

FIGS. 1 and 2 are schematic diagrams illustrating a display device in accordance with an embodiment.

Referring to FIG. 1, the display device 1 in accordance with an embodiment may include a panel 10 and a driving circuit 20 for driving the panel 10.

For example, the panel 10 may include a display unit 110 for displaying an image and a sensor unit 120 for sensing a touch, a pressure, a fingerprint, hovering, etc., within the spirit and the scope of the disclosure. For example, the panel 10 may include pixels PX and sensors SC located (or disposed) while overlapping at least some or a number of the pixels PX. In an embodiment, the sensors SC may include first sensors TX and second sensors RX. In an embodiment (for example, a self-capacitance method), the sensors SC may be one kind of sensors without distinguishing the first and second sensors from each other. The driving circuit 20 may include a display driver 210 (D-IC) for driving the display unit 110 and a sensor driver 220 (T-IC) for driving the sensor unit 120. For example, the pixels PX may display an image by using a display frame period as a unit. For example, the sensors SC may sense an input of a user by using a sensing frame period as a unit. The sensing frame period and the display frame period may be independent from each other or be different from each other. The sensing frame period and the display frame period may be synchronized with each other or be unsynchronized.

In an embodiment, after the display unit 110 and the sensor unit 120 are manufactured separately from each other, the display unit 110 and the sensor unit 120 may be disposed and/or coupled or connected to overlap each other in at least one area or an area. In an embodiment, the display unit 110 and the sensor unit 120 may be integrally manufactured. For example, the sensor unit 120 may be formed on or directly formed on at least one substrate (for example, an upper substrate and/or a lower substrate of a display panel, or a thin film encapsulation layer), or another insulating layer or one of various types of functional layers (for example, an optical layer or a protective layer), which constitutes the display unit 110.

Although a case where the sensor unit 120 is disposed on a front surface (for example, an upper surface on which an image is displayed) of the display unit 110 is illustrated in FIG. 1, the position of the sensor unit 120 is not limited thereto. For example, in an embodiment, the sensor unit 120 may be disposed on a rear surface or both surfaces of the display unit 110. In an embodiment, the sensor unit 120 may be disposed in at least one edge area or an edge area of the display unit 110.

The display unit 110 may include a display substrate 111 and pixels PX formed on the display substrate 111. The pixels PX may be disposed in a display area DA of the display substrate 111.

The display substrate 111 may include the display area DA in which an image is displayed and a non-display area NDA at the periphery of the display area DA. In an embodiment, the display area DA may be disposed in a central area of the display unit 110, and the non-display area NDA may be disposed in an edge area of the display unit 110 to surround or to be adjacent to the display area DA.

The display substrate 111 may be a rigid substrate or a flexible substrate, and the material or property of the display substrate 111 is not particularly limited. For example, the display substrate 111 may be a rigid substrate made of glass or tempered glass, or a flexible substrate with a thin film made of plastic or metal.

Scan lines SL and data lines DL, and the pixels PX connected to the scan lines SL and the data lines DL are disposed in the display area DA. Pixels PX are selected by a scan signal having a turn-on level, which is supplied from the scan lines SL, to be supplied with a data signal from the data lines DL, and emit light with a luminance corresponding to the data signal. Accordingly, an image corresponding to the data signal is displayed in the display area DA. In the disclosure, the structure, driving method, and the like of the pixels PX are not particularly limited. For example, each of the pixels PX may be implemented as a pixel having various structures and/or various driving methods, which may be in the art.

Various types of lines and/or a built-in circuit, connected to the pixels PX of the display area DA may be disposed in the non-display area NDA. In an example, lines for supplying various power sources and various control signals to the display area DA may be disposed in the non-display area NDA. A scan driver and the like may be further disposed in the non-display area NDA.

In the disclosure, the kind of the display unit 110 is not particularly limited. For example, the display unit 110 may be implemented as a self-luminescent display panel such as an organic light emitting display panel. However, in case that the display unit 110 is implemented as a self-luminescent display panel, each pixel is not necessarily limited to a case where the pixel may include only an organic light emitting element. For example, a light emitting element of each pixel may be an organic light emitting diode, an inorganic light emitting diode, a quantum dot or well light emitting diode, etc., within the spirit and the scope of the disclosure. Light emitting elements may be provided in each pixel. The light emitting elements may be connected in series, parallel, series or parallel, etc., within the spirit and the scope of the disclosure. For example, the display unit 110 may be implemented as a non-light emitting display panel such as a liquid crystal display panel. In case that the display unit 110 is implemented as a non-light emitting display panel, the display device 1 may additionally include a light source such as a back-light unit.

The sensor unit 120 may include a sensor substrate 121 and sensors SC formed on the sensor substrate 121. The sensors SC may be disposed in a sensing area SA on the sensor substrate 121.

The sensor substrate 121 may include the sensing area SA that senses a touch input or the like and a peripheral area NSA at the periphery of the sensing area SA. In an embodiment, the sensing area SA may be disposed to overlap at least one area or an area of the display area DA. In an example, the sensing area SA may be set as an area corresponding to the display area DA (for example, an area overlapping the display area DA), and the peripheral area NSA may be set as an area corresponding to the non-display area NDA (for example, an area overlapping the non-display area NDA). In case that a touch input or the like is provided on the display area DA, the touch input may be detected through the sensor unit 120.

The sensor substrate 121 may be a rigid or flexible substrate. The sensor substrate 121 may include at least one insulating layer. Also, the sensor substrate 121 may be a transparent or translucent light transmission substrate, but the disclosure is not limited thereto. For example, in the disclosure, the material and property of the sensor substrate 121 are not particularly limited. For example, the sensor substrate 121 may be a rigid substrate including glass or tempered glass, or a flexible substrate including a thin film made of plastic or metal. In an embodiment, at least one substrate (for example, the display substrate 111, an encapsulation substrate, and/or a thin film encapsulation layer) constituting the display unit 110 or, at least one insulating layer or at least one functional layer, disposed at the inside and/or an outer surface of the display unit 110 may be used as the sensor substrate 121.

The sensing area SA is set as an area that reacts with a touch input (for example, an active area of sensors). Sensors SC for sensing a touch input or the like may be disposed in the sensing area SA. In an embodiment, the sensors SC may include first sensors TX and second sensors RX.

For example, each of the first sensors TX may extend in a first direction DR1. The first sensors TX may be arranged or disposed in a second direction DR2. The second direction DR2 may be different from the first direction DR1. For example, the second direction DR2 may be a direction orthogonal to the first direction DR1. In an embodiment, the extending direction and arrangement direction of the first sensors TX may follow another configuration. Each of the first sensors TX may have a form in which first cells having a relatively wide area and first bridges having a relatively narrow area are connected to each other. Although a case where each of the first cells has a diamond shape is illustrated in FIG. 1, each of the first cells may be formed in various shapes including a circular shape, a quadrangular shape, a triangular shape, a mesh shape, and the like within the spirit and the scope of the disclosure. For example, the first bridges may be and the first cells may be integral with each other on a same layer. In an embodiment, the first bridges may be formed in a layer different from that of the first cells, to electrically connect adjacent first cells to each other. It is to be understood that the shapes disclosed herein may include shapes substantially identical or similar to the shapes.

For example, each of the second sensors RX may extend in the second direction DR2. The second sensors RX may be arranged or disposed in the first direction DR1. In an embodiment, the extending direction and arrangement direction of the second sensors RX may follow another configuration. Each of the second sensors RX may have a form in which second cells having a relatively wide area and second bridges having a relatively narrow area are connected to each other. Although a case where each of the second cells has a diamond shape is illustrated in FIG. 1, each of the first cells may be formed in various shapes including a circular shape, a quadrangular shape, a triangular shape, a mesh shape, and the like within the spirit and the scope of the disclosure. For example, the second bridges and the second cells may be integral with each other on a same layer. In an embodiment, the second bridges may be formed in a layer different from that of the second cells, to electrically connect adjacent second cells to each other.

In an embodiment, each of the first sensors TX and the second sensors RX may include at least one of a metal material, a transparent conductive material, and various other conductive materials, thereby having conductivity. In an example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and the like, or alloys thereof. The first sensors TX and the second sensors RX may be a mesh shape. Also, the first sensors TX and the second sensors RX may include at least one of various transparent conductive materials including silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and the like within the spirit and the scope of the disclosure.

The first sensors TX and the second sensors RX may include at least one of various conductive materials, thereby having conductivity. Also, each of the first sensors TX and the second sensors RX may be a single layer or a multi-layer, and its sectional structure is not particularly limited.

Sensor lines for electrically connecting the sensors SC to the sensor driver 220 (T-IC), and the like may be concentrically disposed in the peripheral area NSA.

The driving circuit 20 may include the display driver 210 (D-IC) for driving the display unit 110 and the sensor driver 220 (T-IC) for driving the sensor unit 120. In an embodiment, the display driver 210 (D-IC) and the sensor driver 220 (T-IC) may be Integrated Chips (ICs) separate from each other. In an embodiment, at least a portion of the display driver 210 (D-IC) and at least a portion of the sensor driver 220 (T-IC) may be integrated together in one IC.

The display driver 210 (D-IC) is electrically connected to the display unit 110 to drive the pixels PX. For example, the display device 1 may include a data driver and a timing controller, and a scan driver may be separately mounted in the non-display area NDA of the display unit 110. In an embodiment, the display driver 210 (D-IC) may include the whole or at least a portion of the data driver, the timing controller, and the scan driver. In an embodiment, the display driver 210 (D-IC) may correspond to at least one of a Graphic Processing Unit (GPU), a Central Processing Unit (CPU), an Application Processor (AP), and the like within the spirit and the scope of the disclosure. In an embodiment, the display driver 210 (D-IC) may be one indicating a set of at least one of the GPU, the CPU, and the AP and the timing controller.

The sensor driver 220 (T-IC) is electrically connected to the sensor unit 120 to drive the sensor unit 120. The sensor driver 220 (T-IC) may include a sensor transmitter and a sensor receiver. In an embodiment, the sensor transmitter and the sensor receiver may be integrated in one IC, but the disclosure is not limited thereto.

Referring to FIG. 2, for example, the sensor unit 120 may be stacked on the top of the display unit 110, and a window WIN may be stacked on the top of the sensor unit 120.

The display unit 110 may include a display substrate 111, a circuit element layer BPL formed on the display substrate 111, and light emitting elements LD formed on the circuit element layer BPL. The circuit element layer BPL may include pixel circuits for driving light emitting elements LD of pixels PX, scan lines SL, data lines DL, and the like within the spirit and the scope of the disclosure.

The sensor unit 120 may include a sensor substrate 121, sensors SC formed on the sensor substrate 121, and a protective layer 122 covering or overlapping the sensors SC. In the embodiment shown in FIG. 2, the sensor substrate 121 may be illustrated in the form of an encapsulation layer covering or overlapping the pixels PX. In an embodiment, the sensor substrate 121 may exist separately from the encapsulation layer covering or overlapping the pixels PX.

The window WIN may be a protective member disposed at the uppermost end of the module of the display device 1, and may be substantially a transparent light transmission substrate. The window WIN may have a multi-layered structure selected from a glass substrate, a plastic film, and a plastic substrate. The window WIN may include a rigid or flexible material, and the material constituting the window WIN is not particularly limited.

Although not shown in the drawing, the display device 1 may further include a polarizing plate (or another kind of anti-reflection layer) for preventing reflection of external light between the window WIN and the sensor unit 120.

Figure 3:
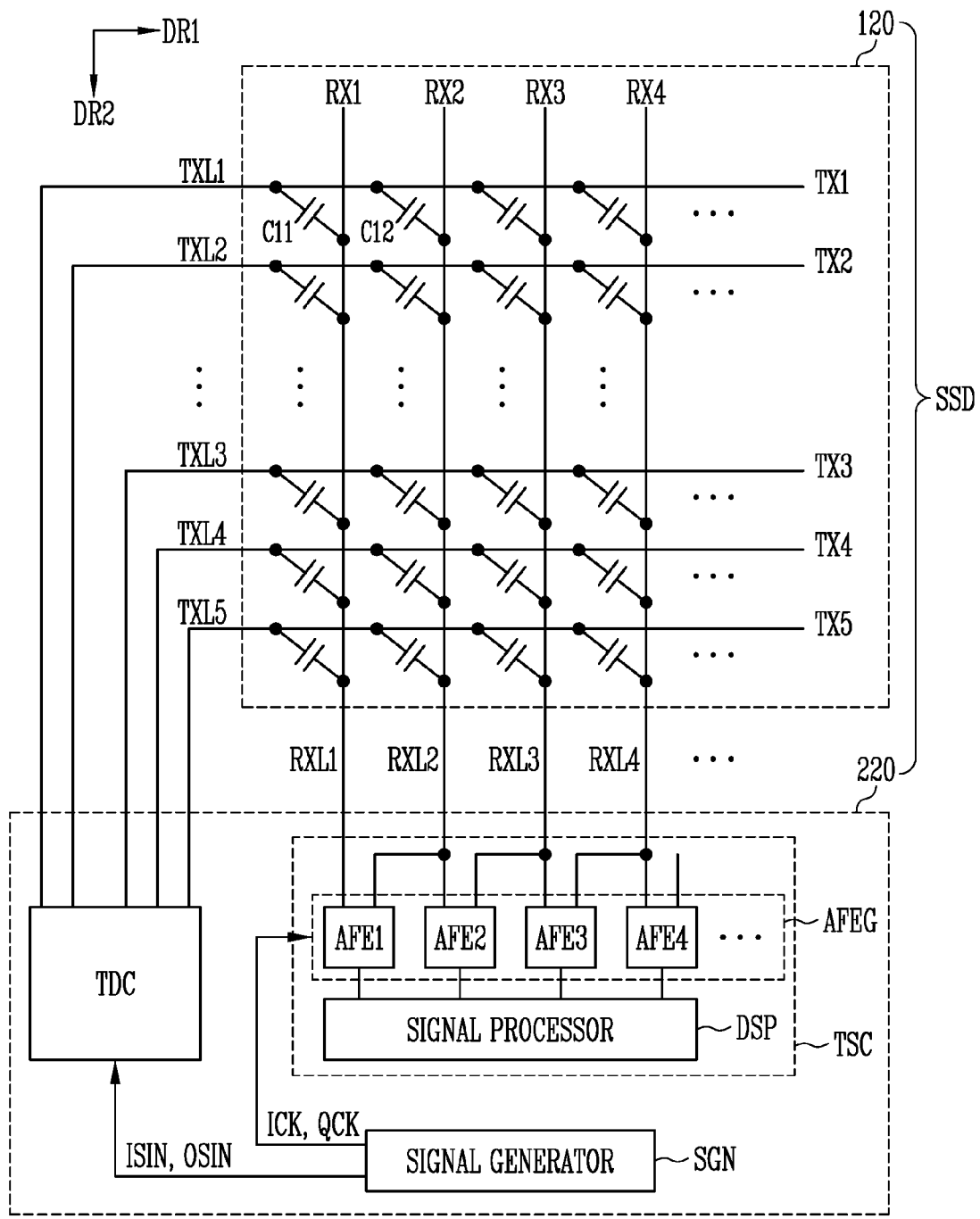
FIG. 3 is a schematic diagram illustrating a sensor device in accordance with an embodiment.

FIG. 3 is a schematic diagram illustrating a sensor device in accordance with an embodiment.

Referring to FIG. 3, the sensor device SSD in accordance with an embodiment may include a sensor unit 120 and a sensor driver 220 (T-IC). The sensor device SSD may be included in the display device 1. The sensor device SSD may be a separate independent product, regardless of the display device 1.

The sensor unit 120 may include first sensors TX1, TX2, TX3, TX4, and TX5 and second sensors RX1, RX2, RX3, and RX4. The first sensors TX1 to TX5 may extend in the first direction DR1, and be arranged or disposed in the second direction DR2. The second sensors RX1 to RX4 may extend in the second direction DR2, and be arranged or disposed in the first direction DR1. The second sensors RX1 to RX4 may intersect the first sensors TX1 to TX5. The first sensors TX1 to TX5 and the second sensors RX1 to RX4 may form a mutual capacitance. For example, a capacitance C11 may be formed between a first sensor TX1 and a second sensor RX1, and a capacitance C12 may be formed between the first sensor TX1 and a second sensor RX2. The sensor driver 220 (T-IC) may sense a change in the capacitances C11 and C12, thereby determining whether a touch of a user has been input, etc., within the spirit and the scope of the disclosure.

The sensor driver 220 (T-IC) may include a sensor transmitter TDC, a sensor receiver TSC, and a signal generator SGN.

The sensor transmitter TDC may be connected to the first sensors TX1 to TX5, and supply driving signals to the first sensors TX1 to TX5. The sensor transmitter TDC may be connected to the first sensors TX1 to TX5 through first sensor lines TXL1, TXL2, TXL3, TXL4, and TXL5. The sensor transmitter TDC may receive a first driving signal ISIN and a second driving signal OSIN from the signal generator SGN, and selectively supply the first driving signal ISIN or the second driving signal OSIN to each of the first sensors TX1 to TX5.

The sensor receiver TSC may be connected to the second sensors RX1 to RX4, receive sensing signals from the second sensors RX1 to RX4, and demodulate the sensing signals by using demodulation clock signals ICK and QCK. The sensor receiver TSC may be connected to the second sensors RX1 to RX4 through second sensor lines RXL1, RXL2, RXL3, and RXL4. The sensor receiver TSC may include an analog front end group AFEG and a signal processor DSP.

The analog front end group AFEG may include analog front ends AFE1, AFE2, AFE3, and AFE4. Each of the analog front ends AFE1, AFE2, AFE3, and AFE4 may be connected to two adjacent second sensors among the second sensors RX1 to RX4. For example, a first analog front end AFE1 may be connected to the second sensor RX1 and the second sensor RX2. A second analog front end AFE2 may be connected to the second sensor RX2 and a second sensor RX3. A third analog front end AFE3 may be connected to the second sensor RX3 and the second sensor RX4. A fourth analog front end AFE4 may be connected to the second sensor RX4 and a second sensor (not shown). Each of the analog front ends AFE1, AFE2, AFE3, and AFE4 generates a digital signal from which a common noise is removed by using sensing signals of adjacent sensor sensors as differential signals, so that a Signal to Noise Ratio (SNR) can be increased.

The signal processor DSP may calculate sensing values by using digital signals provided from the analog front end group AFEG. For example, a digital signal provided from the first analog front end AFE1 may correspond to a difference between a level lv2 of a sensing signal of the second sensor RX2 and a level lv1 of a sensing signal of the second sensor RX1 (lv2-lv1). A digital signal provided from the second analog front end AFE2 may correspond to a difference between a level lv3 of a sensing signal of the second sensor RX3 and the level lv2 of the sensing signal of the second sensor RX2 (lv3-lv2). A digital signal provided from the third analog front end AFE3 may correspond to a difference between a level lv4 of a sensing signal of the second sensor RX4 and the level lv3 of the sensing signal of the second sensor RX3 (lv4-lv3).

For example, the signal processor DSP may calculate a relative level lv2' of the sensing signal of the second sensor RX2, a relative level lv3' of the sensing signal of the second sensor RX3, and a relative level lv4' of the sensing signal of the second sensor RX4, by using the following Equation 1 to Equation 3.

$$lv2'=lv2-lv1=(lv2-lv1) \quad \text{Equation 1}$$

$$lv3'=lv3-lv1=(lv3-lv2)+(lv2-lv1) \quad \text{Equation 2}$$

$$lv4'=lv4-lv1=(lv4-lv3)+(lv3-lv2)+(lv2-lv1) \quad \text{Equation 3}$$

The signal processor DSP may determine whether a touch of a user has been input, etc. by using the levels lv2', lv3', and lv4' as sensing values, or transfer the sensing values to the display driver 210 (D-IC).

The signal generator SGN may generate a basic clock signal therein, and generate the driving signals ISIN and OSIN and the demodulation clock signals ICK and QCK to be synchronized with the basic clock signal. The signal generator SGN may provide the driving signals ISIN and OSIN to the sensor transmitter TDC, and provide the demodulation clock signals ICK and QCK to the analog front end group AFEG. A detailed configuration of the signal generator SGN will be described in detail with reference to drawings from FIG. 7.

Figure 4:
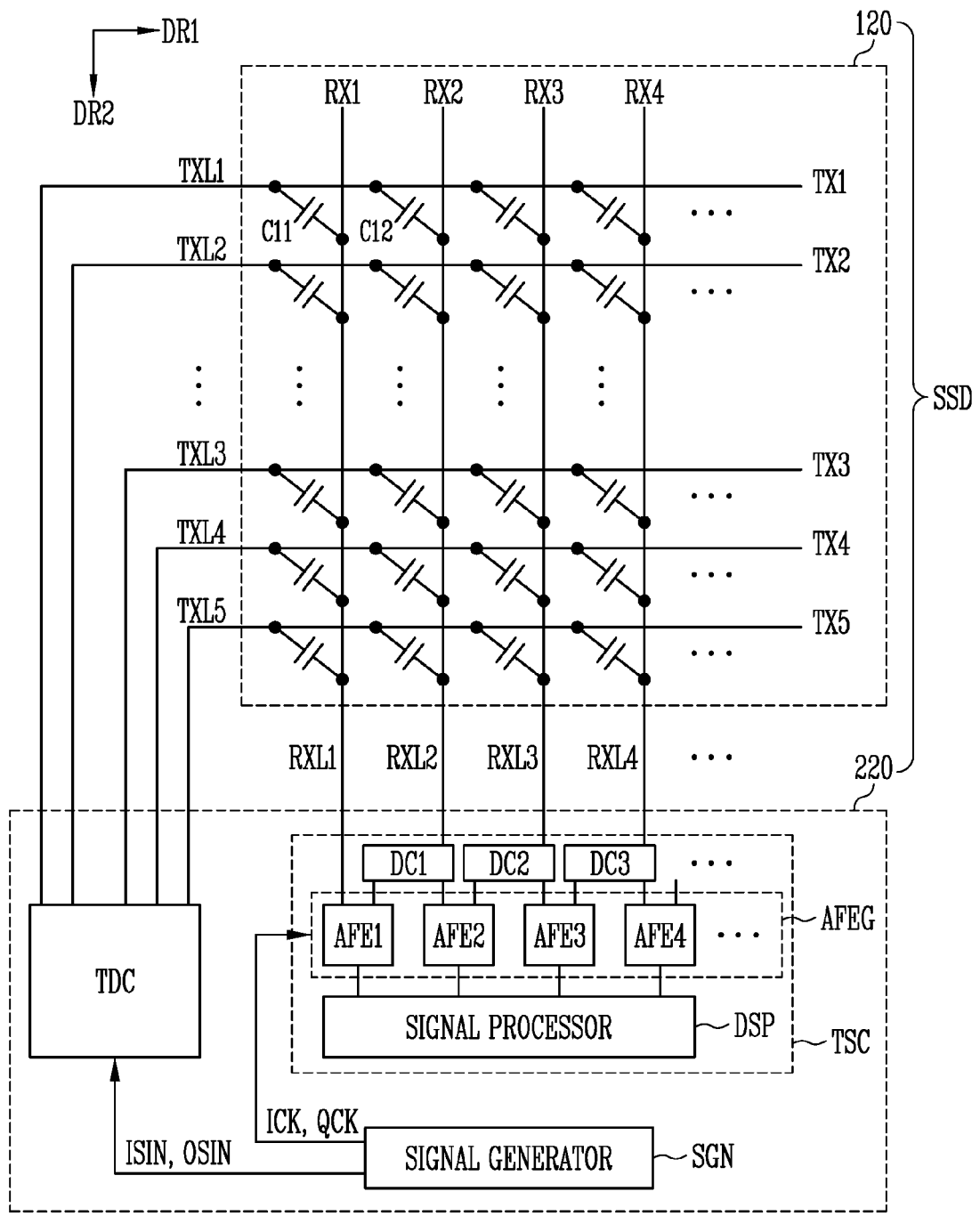
FIG. 4 is a schematic diagram illustrating a sensor device in accordance with an embodiment.

FIG. 4 is a schematic diagram illustrating a sensor device in accordance with an embodiment.

A sensor receiver TSC shown in FIG. 4 may be different from the sensor receiver TSC shown in FIG. 3, in that the sensor receiver TSC shown in FIG. 4 further may include distribution circuits DC1, DC2, and DC3.

The distribution circuits DC1, DC2, and DC3 may be disposed between at least some or a number of second sensors RX1 to RX4 and analog front ends AFE1 to AFE4, generate signals having the same magnitude (for example, the same voltage level or the same current amount), based on each of sensing signals provided from the at least some or a number of the second sensors RX1 to RX4, and distribute the generated signals to the analog front ends AFE1 to AFE4. For example, the distribution circuits DC1, DC2, and DC3 may be include an amplifier, a buffer, and the like, and amplify or mirror each of the sensing signals, thereby outputting the amplified or mirrored sensing signal.

For example, a first distribution circuit DC1 may receive a second sensing signal provided from a second sensor RX2, and provide signals having the same magnitude as the second sensing signal respectively to a first analog front end AFE1 and a second analog front end AFE2. In case that the second sensing signal does not pass through the first distribution circuit DC1, the second sensing signal may be simultaneously supplied to the first analog front end AFE1 and the second analog front end AFE2. Therefore, a magnitude of the second sensing signal may be different from that of a first sensing signal received from a second sensor RX1 due to a relative increase in load with respect to the second sensing signal. For example, the magnitude of the second sensing signal may be smaller than that of the first sensing signal. Therefore, in this embodiment, signals having the same magnitude as the second sensing signal may be respectively provided to the first analog front end AFE1 and the second analog front end AFE2 by using the first distribution circuit DC1.

Similarly, a second distribution circuit DC2 may receive a third sensing signal provided from a second sensor RX3, and provide signals having the same magnitude as the third sensing signal respectively to the second analog front end AFE2 and a third analog front end AFE3. A third distribution circuit DC3 may receive a fourth sensing signal provided from a second sensor RX4, and provide signals having the same magnitude as the fourth sensing signal respectively to the third analog front end AFE3 and a fourth analog front end AFE4.

Figure 5:
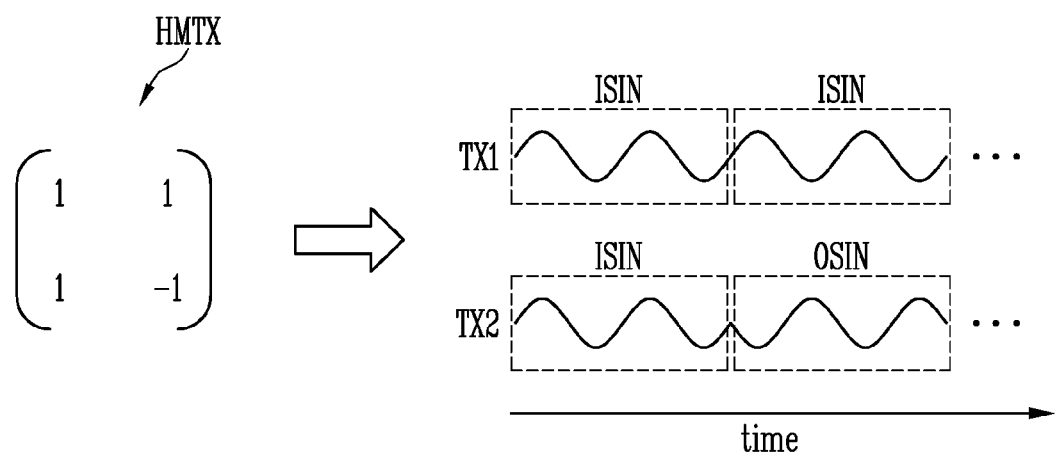
FIG. 5 is a schematic diagram illustrating a first driving signal and a second driving signal in accordance with an embodiment.

FIG. 5 is a schematic diagram illustrating a first driving signal and a second driving signal in accordance with an embodiment.

Driving signals may include a first driving signal ISIN and a second driving signal OSIN. The second driving signal OSIN may have a frequency equal to that of the first driving signal ISIN and have a phase different from that of the first driving signal ISIN. For example, the second driving signal OSIN may have a phase different by about 180 degrees from that of the first driving signal ISIN.

The sensor transmitter TDC may provide the first driving signal ISIN or the second driving signal OSIN to the first sensors TX1 and TX2 according to a rule. For example, the sensor transmitter TDC may provide the first driving signal ISIN or the second driving signal OSIN to the first sensors TX1 and TX2 according to a Hadamard matrix HMTX. For example, the sensor transmitter TDC may provide the first driving signal ISIN to a first sensor which 1 in the Hadamard matrix HMTX indicates, and provide the second driving signal OSIN to a first sensor which −1 in the Hadamard matrix HMTX indicates.

Rows of the Hadamard matrix HMTX may indicate the first sensors TX1 and TX2 to which a driving signal is to be applied, and columns of the Hadamard matrix HMTX may indicate a time at which the driving signal is to be applied. A method of driving a touch panel using a capacitance method by using the Hadamard matrix or a Walsh-Hadamard matrix may follow the relevant art, and therefore, its detailed description will be omitted. In case that the method follows the Hadamard matrix HMTX, a two-dimensional coordinate can be derived through the second sensors RX1 to RX2 even in case that driving signals ISIN and OSIN are simultaneously applied to first sensors TX1 and TX2. Thus, sensing time can be decreased or SNR can be increased.

Figure 6:
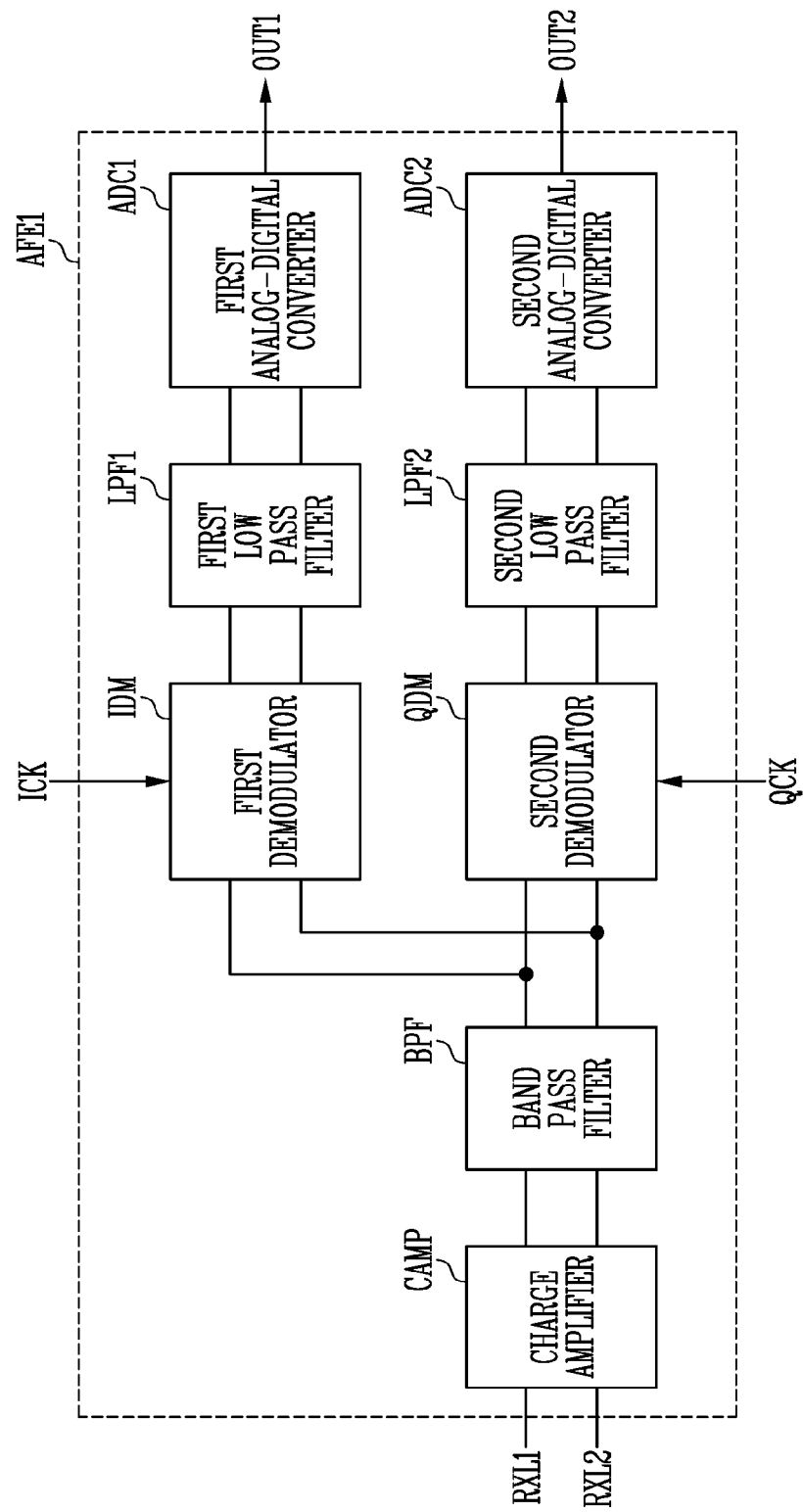
FIG. 6 is a schematic diagram illustrating an analog front end in accordance with an embodiment.

FIG. 6 is a schematic diagram illustrating an analog front end in accordance with an embodiment.

Referring to FIG. 6, the first analog front end AFE1 in accordance with an embodiment may include a charge amplifier CAMP, a band pass filter BPF, a first demodulator IDM, a second demodulator QDM, a first low pass filter LPF1, a second low pass filter LPF2, a first analog-digital converter ADC1, and a second analog digital converter ADC2.

The charge amplifier CAMP may receive sensing signals from two sensors RX1 and RX2 among the second sensors RX1 to RX4. For example, a first input terminal (for example, non-inverting terminal) of the charge amplifier CAMP may be connected to a second sensor line RXL2, and a second input terminal (for example, an inverting terminal) of the charge amplifier CAMP may be connected to a second sensor line RXL1. Therefore, the charge amplifier CAMP may output a signal corresponding to a difference of a sensing signal of the second sensor RX2 and a level of a sensing signal of the second sensor RX1. The charge amplifier CAMP may be a fully differential amplifier, to output the signal corresponding to the difference between the level of the sensing signal of the second sensor RX2 and the level of the sensing signal of the second sensor RX1 and an inverted signal thereof. In FIG. 6, two internal signal lines are illustrated in parallel by assuming that the first and second digital converters ADC1 and ADC2 have a specification requiring an input signal and an inverted input signal. However, in an embodiment, an output terminal of the charge amplifier CAMP may be a single-ended terminal, to only the signal corresponding to the difference between the level of the sensing signal of the second sensor RX2 and the level of the sensing signal of the second sensor RX1.

The band pass filter BPF may filter an output signal of the charge amplifier CAMP to have a set frequency band. For example, a frequency band may include a frequency (or central frequency) of sensing signals, and noise components may be located at the outside of the frequency band.

The first demodulator IDM may demodulate an output signal of the band pass filter BPF, based on the first demodulation clock signal ICK. The second demodulator QDM may demodulate the output signal of the band pass filter BPF, based on the second demodulation clock signal QCK. For example, the first demodulator IDM may be an In-phase (I) demodulator, and the second demodulator QDM may be a Quadrature (Q) demodulator. For example, the first demodulator IDM and the second demodulator QDM may be perform IQ demodulation. The second demodulation clock signal QCK may have a frequency equal to that of the first demodulation clock signal ICK and but have a phase different by about 90 degrees from that of the first demodulation clock signal ICK. For example, the second demodulation clock signal QCK may have a phase delayed by 90 about degrees from that of the first demodulation clock signal ICK.

The first demodulator IDM may be a mixer. For example, a frequency (or central frequency of an interest band) of the first demodulation clock signal ICK may be set equal to that of the output signal of the band pass filter BPF. According to frequency mixing, an output signal of the first demodulator IDM may include a low frequency band (for example, 0 Hz as a difference between the frequency of the first demodulation clock signal ICK and the frequency of the output signal of the band pass filter BPF), a high frequency band (for example, a sum of the frequency of the first demodulation clock signal ICK and the frequency of the output signal of the band pass filter BPF), and other harmonic components.

Similarly, the second demodulator QDM may be a mixer. For example, a frequency (or central frequency of an interest band) of the second demodulation clock signal QCK may be set equal to that of the output signal of the band pass filter BPF. According to frequency mixing, an output signal of the second demodulator QDM may include a low frequency band (for example, 0 Hz as a difference between the frequency of the second demodulation clock signal QCK and the frequency of the output signal of the band pass filter BPF), a high frequency band (for example, a sum of the frequency of the second demodulation clock signal QCK and the frequency of the output signal of the band pass filter BPF), and other harmonic components.

The first low pass filter LPF1 may filter the output signal of the first demodulator IDM to have a set frequency band. The set frequency band of the first low pass filter LPF1 may be lower than the set frequency band of the band pass filter BPF. For example, the first low pass filter LPF1 may allow only a signal of a low frequency band using 0 Hz as the center in the output signal of the first demodulator IDM to pass therethrough.

The second low pass filter LPF2 may filter the output signal of the second demodulator QDM to have a set frequency band. The set frequency band of the second low pass filter LPF2 may be lower than the set frequency band of the band pass filter BPF. For example, the second low pass filter LPF2 may allow only a signal of a low frequency band using 0 Hz as the center in the output signal of the second demodulator QDM to pass therethrough.

The first analog-digital converter ADC1 may convert an output signal of the first low pass filter LPF1 into a first digital signal OUT1. Since the first analog-digital converter ADC1 receives the signal of the low frequency band from the first low pass filter LPF1, the first analog-digital converter ADC1 can operate at a low sampling rate. Since the frequency of a clock signal can be low, the first analog-digital converter ADC1 have advantages in terms of power consumption and configuration cost.

Similarly, the second analog-digital converter ADC2 may convert an output signal of the second low pass filter LPF2 into a second digital signal OUT2. Since the second analog-digital converter ADC2 receives the signal of the low frequency band from the second low pass filter LPF2, the second analog-digital converter ADC2 can operate at a low sampling rate. Since the frequency of a clock signal can be low, the second analog-digital converter ADC2 have advantages in terms of power consumption and configuration cost.

A phase mismatch may exist between the first demodulation clock signal ICK and the output signal of the band pass filter BPF. This may occur due to various factors including a temperature change, an RC delay caused by positions of the first sensor TX and the second sensor RX, and the like, and therefore, it is difficult to check how much phases are mismatched. Similarly, a phase mismatch may exist between the second demodulation clock signal QCK and the output signal of the band pass filter BPF.

The signal processor DSP may sense a final sensing value by adding up a square value of the first digital signal OUT1 and a square value of the second digital signal OUT2 (see Equation 4).

$$(A\sin\theta)^2 + \left(A\sin\left(\frac{\pi}{2} + \theta\right)\right)^2 = (A\sin\theta)^2 + (A\cos\theta)^2 = A^2 \quad \text{Equation 4}$$

A sin θ may correspond to the I-demodulated first digital signal OUT1, and $$A\sin\left(\frac{\pi}{2} + \theta\right)$$

may correspond to the Q-demodulated second digital signal OUT2. Referring to Equation 4, it can be seen that an original amplitude A is recovered regardless of the magnitude of a phase mismatch θ.

Figure 7:
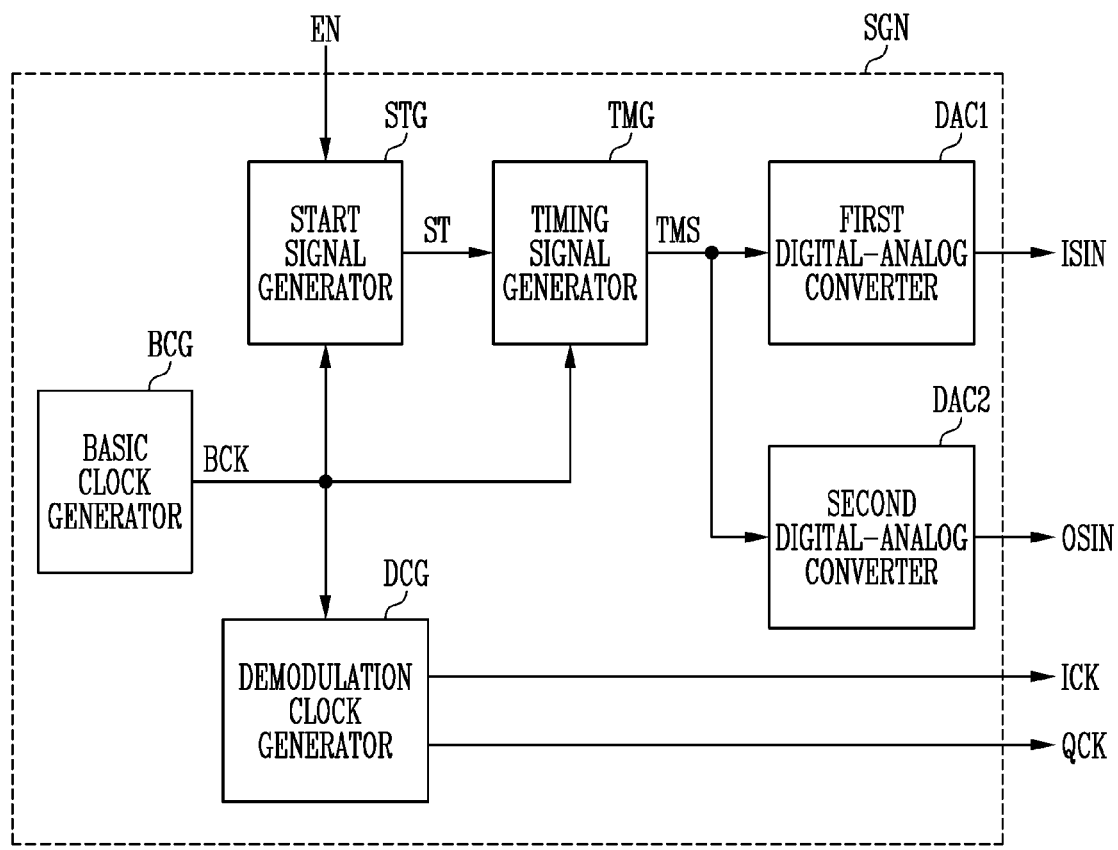
FIG. 7 is a schematic diagram illustrating a signal generator in accordance with an embodiment.

FIG. 7 is a schematic diagram illustrating a signal generator in accordance with an embodiment.

Referring to FIG. 7, the signal generator SGN in accordance with an embodiment may include a basic clock generator BCG, a start signal generator STG, a timing signal generator TMG, a first digital-analog converter DAC1, a second digital-analog converter DAC2, and a demodulation clock generator DCG.

The basic clock generator BCG may generate a basic clock signal BCK. A detailed configuration of the basic clock generator BCG will be described with reference to FIGS. 8 and 9.

The start signal generator STG may generate a start signal ST to be synchronized with the basic clock signal BCK and an external enable signal EN. Hereinafter, a detailed configuration of the start signal generator STG will be described with reference to FIGS. 10 and 11.

The timing signal generator TMG may sequentially generate timing signals TMS to be synchronized with the basic clock signal BCK and the start signal ST. Hereinafter, a detailed configuration of the timing signal generator TMG will be described with reference to FIGS. 12 and 13.

The first digital-analog converter DAC1 may generate a first driving signal ISIN, based on the timing signals TMS. The second digital-analog converter DAC2 may generate a second driving signal OSIN, based on the timing signals TMS. Hereinafter, detailed configurations of the first and second digital-analog converters DAC1 and DAC2 will be described with reference to FIGS. 14 to 16.

The demodulation clock generator DCG may generate a first demodulation clock signal ICK and a second demodulation clock signal QCK to be synchronized with the basic clock signal BCK. Hereinafter, a detailed configuration of the demodulation clock generator DCG will be described with reference to FIGS. 17 and 18.

Figure 8:
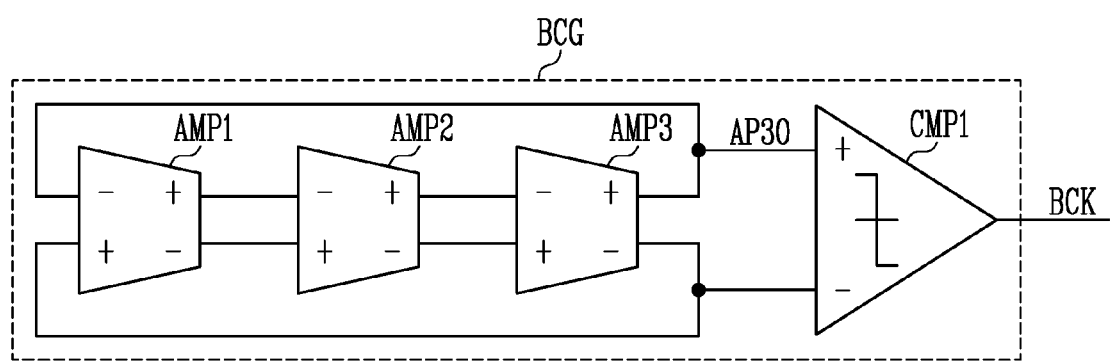
FIGS. 8 and 9 are schematic diagrams illustrating a basic clock generator in accordance with an embodiment.
Figure 9:
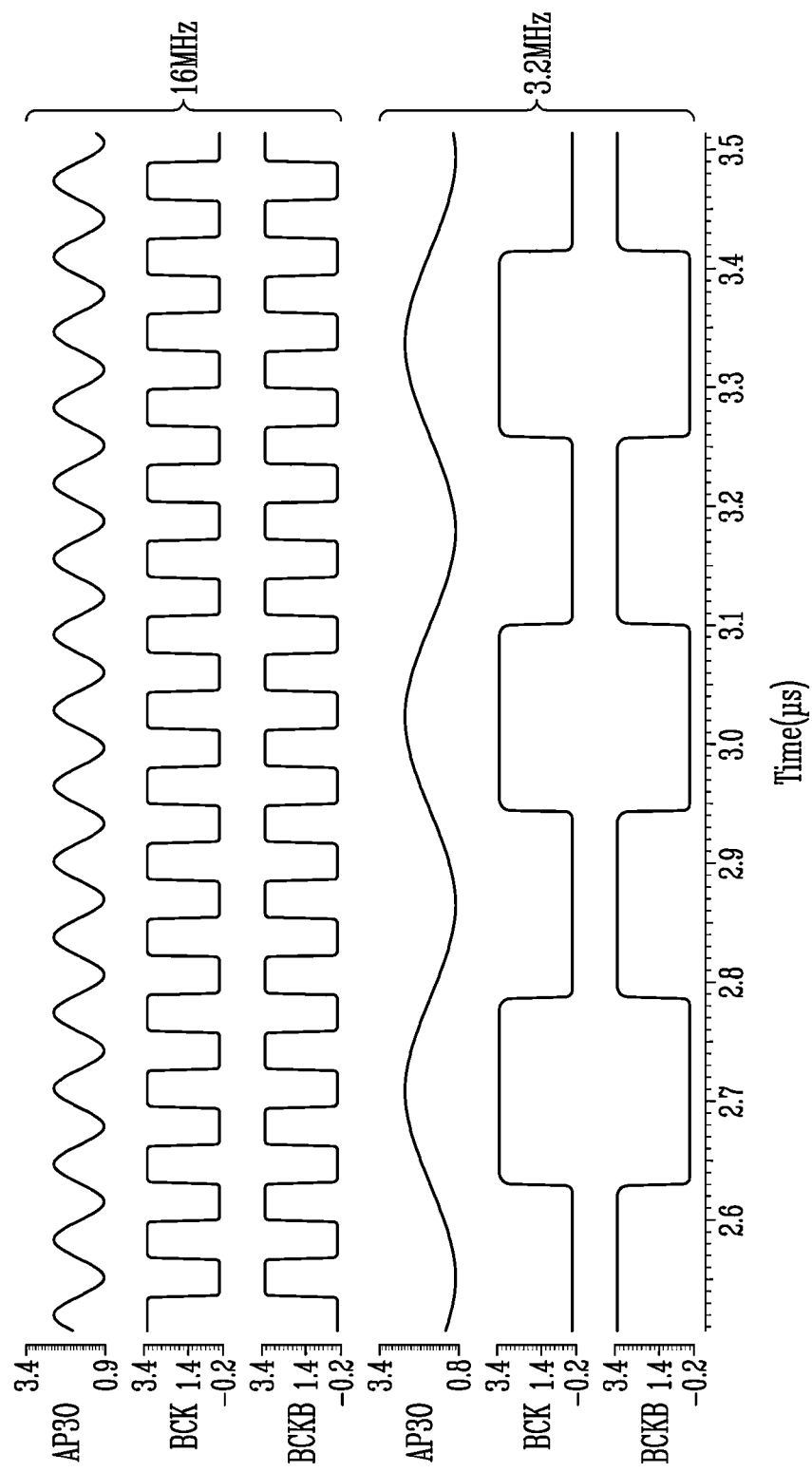

FIGS. 8 and 9 are schematic diagrams illustrating a basic clock generator in accordance with an embodiment.

Referring to FIG. 8, the basic clock generator BCG may include fully differential amplifiers AMP1, AMP2, and AMP3 and a comparator CMP1.

The fully differential amplifiers AMP1, AMP2, and AMP3 may be connected in series (sequentially connected) in a ring structure. For example, a non-inverting output terminal of a third fully differential amplifier AMP3 may be connected to an inverting input terminal of a first fully differential amplifier AMP1. An inverting output terminal of the third fully differential amplifier AMP3 may be connected to a non-inverting input terminal of the first fully differential amplifier AMP1. A non-inverting output terminal of the first fully differential amplifier AMP1 may be connected to an inverting input terminal of a second fully differential amplifier AMP2. An inverting output terminal of the first fully differential amplifier AMP1 may be connected to a non-inverting input terminal of the second fully differential amplifier AMP2. A non-inverting output terminal of the second fully differential amplifier AMP2 may be connected to an inverting input terminal of the third fully differential amplifier AMP3. An inverting output terminal of the second fully differential amplifier AMP2 may be connected to a non-inverting input terminal of the third fully differential amplifier AMP3. In order to operate as a ring oscillator, the fully differential amplifiers AMP1, AMP2, and AMP3 may be an odd number.

Input terminals of the comparator CMP1 may be respectively connected to the output terminals of any one (AMP3) among the fully differential amplifiers AMP1, AMP2, and AMP3, and an output terminal of the comparator CMP1 may provide the basic clock signal BCK. For example, a non-inverting input terminal of the comparator CMP1 may be connected to the non-inverting output terminal of the third fully differential amplifier AMP3. An inverting input terminal of the comparator CMP1 may be connected to the inverting output terminal of the third fully differential amplifier AMP3. In order to refer to this in description of FIG. 9, it is illustrated that an output signal AP30 is output from the non-inverting output terminal of the fully differential amplifier AMP3.

Referring to FIG. 9, with respect to each of about 16 MHz and about 3.2 MHz, the output signal AP30 of the third fully differential amplifier AMP3, the basic clock signal BCK, and an inverted signal BCKB of the basic clock signal BCK are simulated.

Figure 10:
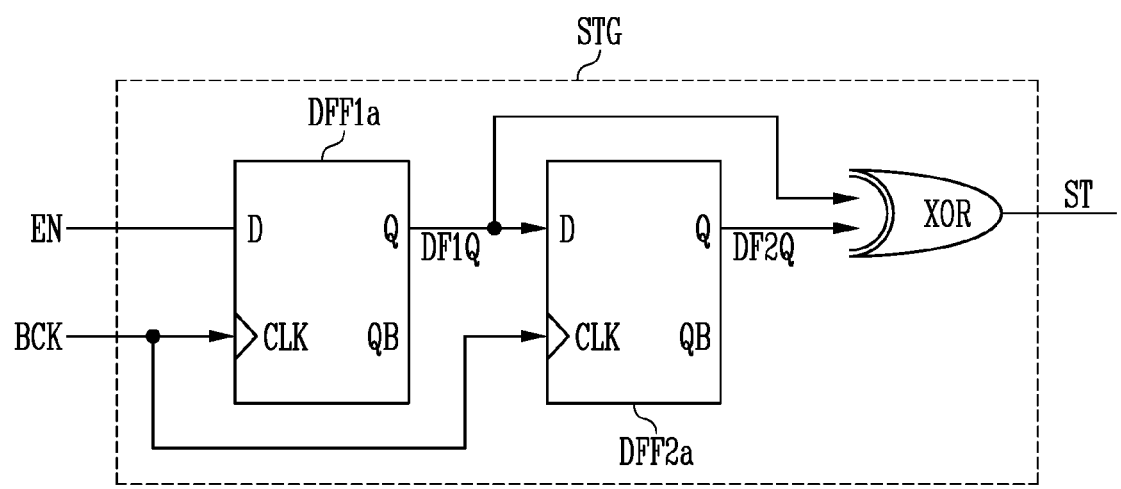
FIGS. 10 and 11 are schematic diagrams illustrating a start signal generator in accordance with an embodiment.
Figure 11:
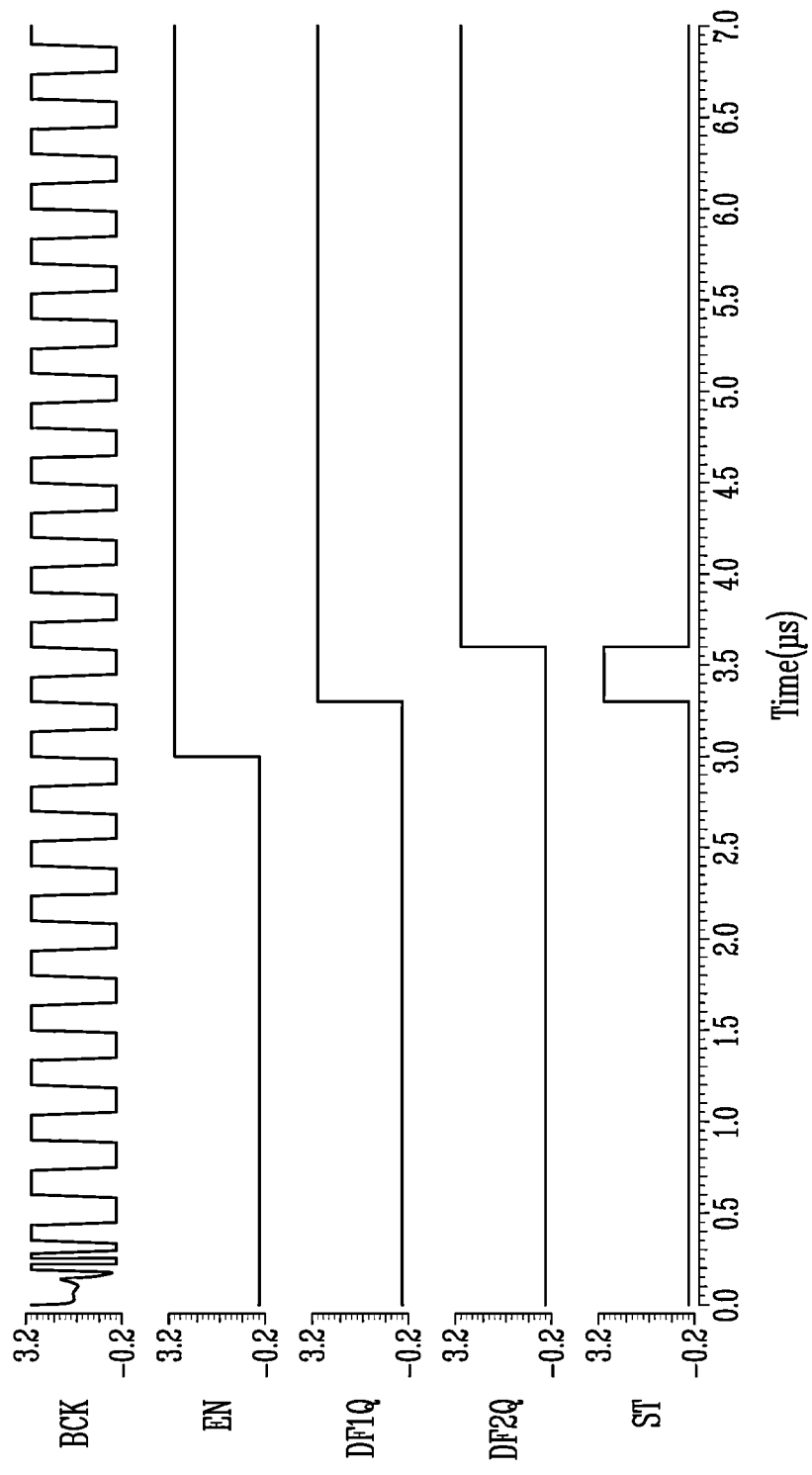

FIGS. 10 and 11 are schematic diagrams illustrating a start signal generator in accordance with an embodiment.

Referring to FIG. 10, the start signal generator STG may include first and second flip flops DFF1a and DFF2a and an XOR gate XOR.

The first flip flop DFF1a may output a first logic signal DF1Q, based on the enable signal EN and the basic clock signal BCK. The first flip flop DFF1a may be a D flip flop. The enable signal EN may be input to a D input terminal D of the first flip flop DFF1a, and the basic clock signal BCK may be input to a clock input terminal CLK of the first flip flop DFF1a. The first logic signal DF may be output from a Q output terminal Q of the first flip flop DFF1a.

The second flip flop DFF2a may output a second logic signal DF2Q, based on the first logic signal DF1Q and the basic clock signal BCK. The second flip flop DFF2a may be a D flip flop. The first logic signal DF1Q may be input to a D input terminal D of the second flip flop DFF2a, and the basic clock signal BCK may be input to a clock input terminal CLK of the second flip flop DFF2a. The second logic signal DF2Q may be output from a Q output terminal Q of the second flip flop DFF2a.

The XOR gate XOR may output a start signal ST by using, as inputs, the first logic signal DF1Q and the second logic signal DF2Q. The XOR gate XOR may operate according to a XOR truth table. For example, in case that logic levels of the first logic signal DF1Q and the second logic signal DF2Q are different from each other, the XOR gate XOR may output a logic high level as the start signal ST.

Referring to FIG. 11, simulation results of the first logic signal DF1Q, the second logic signal DF2Q, and the start signal ST with respect to the given basic clock signal BCK and the given enable signal EN can be seen.

Figure 12:
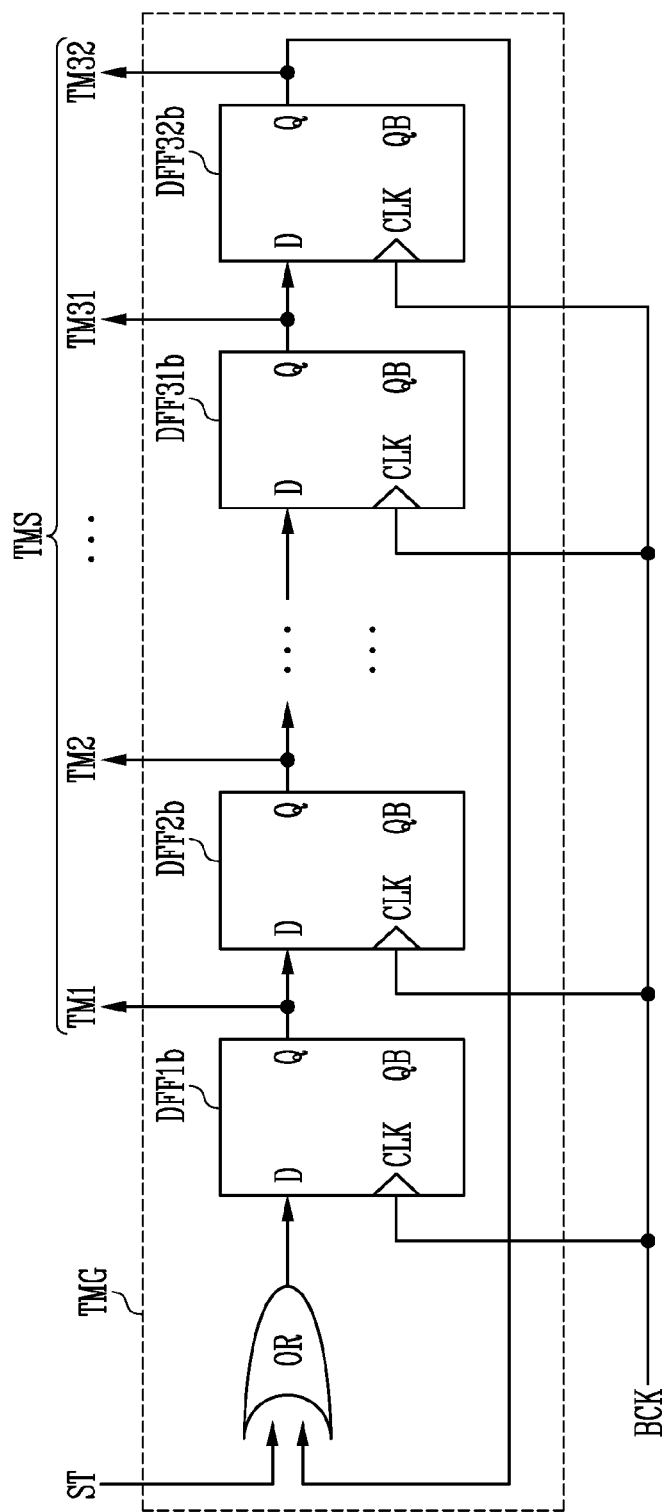
FIGS. 12 and 13 are schematic diagrams illustrating a timing signal generator in accordance with an embodiment.
Figure 13:
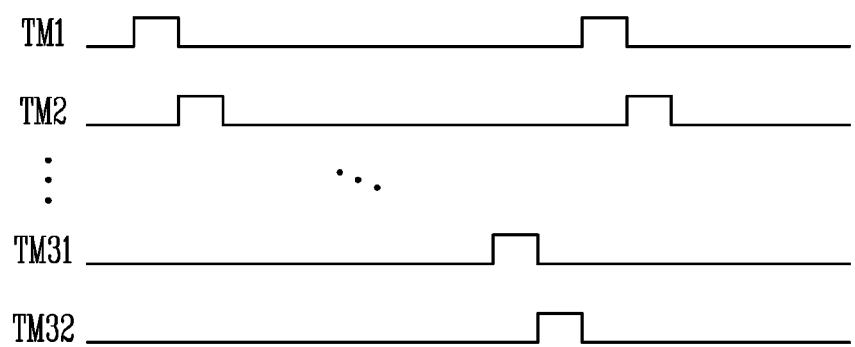

FIGS. 12 and 13 are schematic diagrams illustrating a timing signal generator in accordance with an embodiment.

Referring to FIG. 12, the timing signal generator TMG may include flip flops DFF1b, DFF2b, DFF31b, and DFF32b and an OR gate OR.

The flip flops DFF1b, DFF2b, DFF31b, and DFF32b may be connected in series (or sequentially connected), and output logic signals TM1, TM2, TM31, and TM32 as timing signals TMS. Each of the flip flops DFF1b to DFF32b may be a D flip flop. For example, a D input terminal of a first flip flop DFF1b may be connected to an output terminal of the OR gate OR, a clock input terminal CLK of the first flip flop DFF1b may receive the basic clock signal BCK, and a Q output terminal of the first flip flop DFF1b may output a first logic signal TM1. A D input terminal of a second flip flop DFF2b may be connected to the output terminal of the first flip flop DFF1b, a clock input terminal CLK of the second flip flop DFF2b may receive the basic clock signal BCK, and a Q output terminal of the second flip flop DFF2b may output a second logic signal TM2. Similarly, a D input terminal of a thirty-first flip flop DFF31b may be connected to an output terminal of a thirtieth flip flop (not shown), a clock input terminal CLK of the thirty-first flip flop DFF31b may receive the basic clock signal BCK, and a Q output terminal of the thirty-first flip flop DFF31b may output a thirty-first logic signal TM31. A D input terminal of a thirty-second flip flop DFF32b may be connected to the output terminal of the thirty-first flip flop DFF31b, a clock terminal CLK of the thirty-second flip flop DFF32b may receive the basic clock signal BCK, and a Q output terminal of the thirty-second flip flop DFF32b may output a thirty-second logic signal TM32. A number of the flip flops DFF31b to DFF32b may be determined according to a resolution of the first digital-analog converter DAC1 and the second digital-analog converter DAC2.

Input terminals of the OR gate OR may receive the start signal ST and the logic signal TM32 of the last flip flop DFF32b among the flip flops DFF1b to DFF32b, and an output terminal of the OR gate OR may be connected to the input terminal of the first flip flop DFF1b among the flip flops DFF1b to DFF32b. The OR gate OR may operate according to a OR truth table. For example, in case that at least one of the start signal ST and the thirty-second logic signal TM32 has a logic high level, the OR gate OR may output the logic high level.

Referring to FIG. 13, the logic signals TM1, TM2, TM31, and TM32 constituting the timing signals TMS are illustrated, by way of example. The logic signals TM1, TM2, TM31, and TM32 may be generated in the order of their reference numerals.

Figure 14:
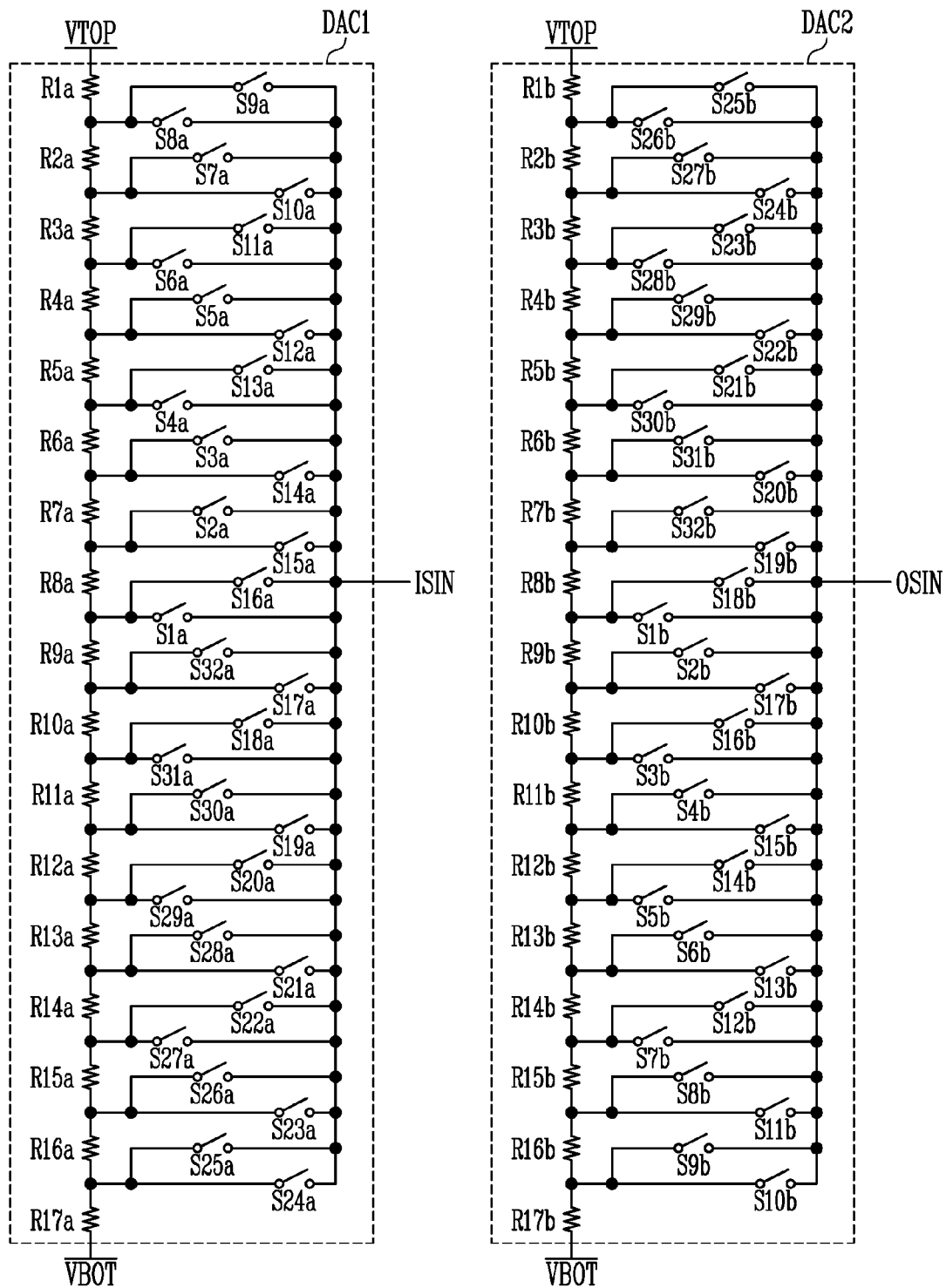
FIGS. 14 to 16 are schematic diagrams illustrating first and second digital-analog converters in accordance with an embodiment.
Figure 15:
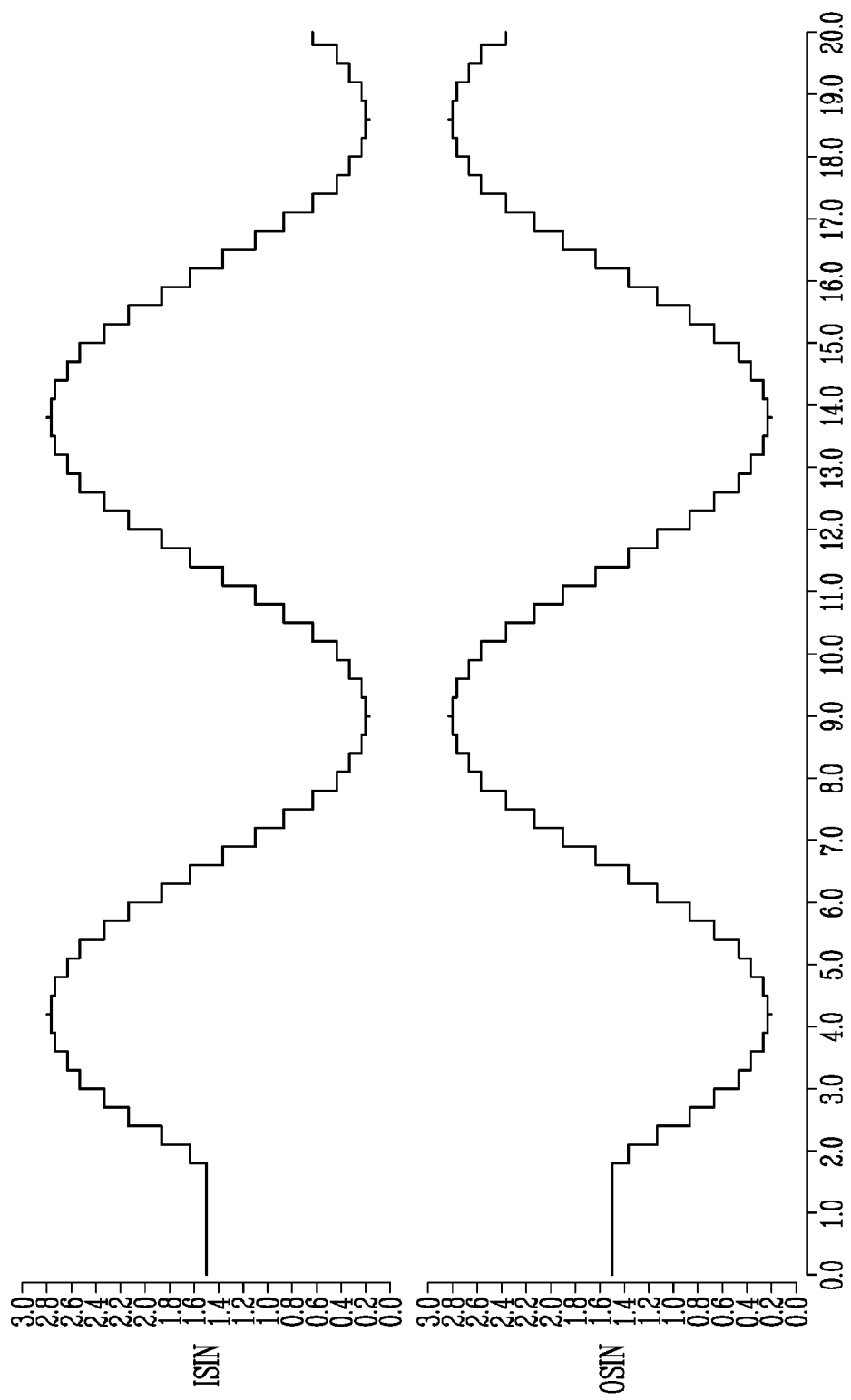
Figure 16:
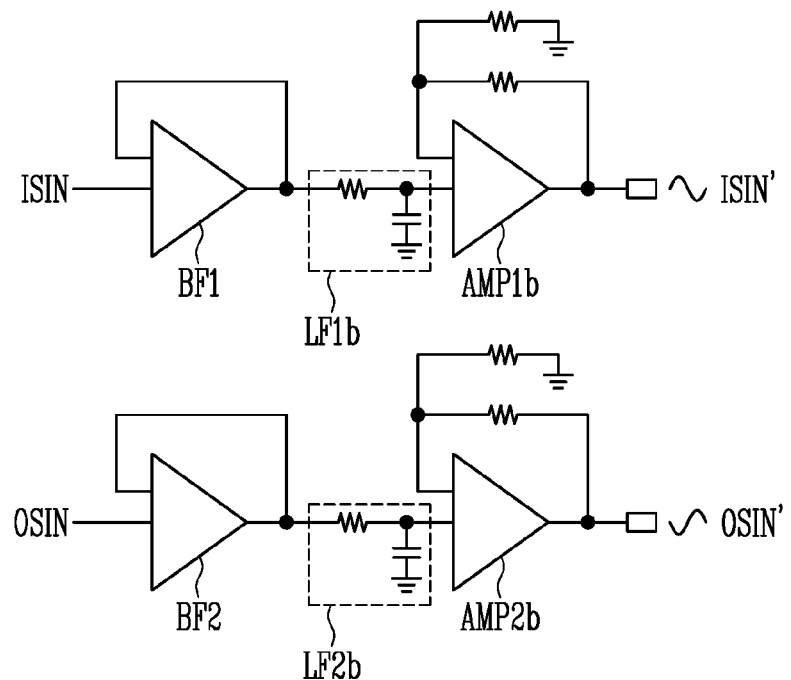

FIGS. 14 to 16 are schematic diagrams illustrating first and second digital-analog converters in accordance with an embodiment.

Referring to FIG. 14, the first digital-analog converter DAC1 may include a resistor string and first switches S1a, S2a, S3a, S4a, S5a, S6a, S7a, S8a, S9a, S10a, S11a, S12a, S13a, S14a, S15a, S16a, S17a, S18a, S19a, S20a, S21a, S22a, S23a, S24a, S25a, S26a, S27a, S28a, S29a, S30a, S31a, and S32a. A number of the first switches S1a to S32a may be equal to that of the timing signals TMS, and each of the first switches S1a to S32a may receive a corresponding signal among the timing signals TMS. The resistor string may include resistors R1a, R2a, R3a, R4a, R5a, R6a, R7a, R8a, R9a, R10a, R11a, R12a, R13a, R14a, R15a, R16a, and R17a connected in series between a high voltage source VTOP and a low voltage source VBOT.

The first switches S1a to S32a may be connected in parallel between an output terminal through which the first driving signal ISIN is output and the resistor string. For example, two first switches (for example, S8a and S9a) may be connected in parallel between the output terminal and a node between adjacent resistors (for example, R1a and R2a).

The first switches S1a to S32a may be sequentially turned on according to the timing signals TMS. For example, a first switch Sla, a first switch S2a, . . . , a first switch S31a, and a first switch S32a may be sequentially turned on in the order of their reference numerals.

The second digital-analog converter DAC2 may include a resistor string and second switches S1b, S2b, S3b, S4b, S5b, S6b, S7b, S8b, S9b, S10b, S11b, S12b, S13b, S14b, S15b, S16b, S17b, S18b, S19b, S20b, S21b, S22b, S23b, S24b, S25b, S26b, S27b, S28b, S29b, S30b, S31b, and S32b). A number of the second switches S1b to S32b may be equal to that of the timing signals TMS, and each of the second switches S1b to S32b may receive a corresponding signal among the timing signals TMS. The resistor string may include resistors R1b, R2b, R3b, R4b, R5b, R6b, R7b, R8b, R9b, R10b, R11b, R12b, R13b, R14b, R15b, R16b, and R17b connected in series between the high voltage source VTOP and the low voltage source VBOT.

The second switches S1b to S32b may be connected in parallel between an output terminal through which the second driving signal OSIN is output and the resistor string. For example, two second switches (for example, S25b and S26b) may be connected in parallel between the output terminal and a node between adjacent resistors (for example, R1b and R2b).

The second switches S1b to S32b may be sequentially turned on according to the timing signals TMS. For example, a second switch S1b, a second switch S2b, . . . , a second switch S31b, and a second switch S32b may be sequentially turned on in the order of their reference numerals.

The first digital-analog converter DAC1 and the second digital-analog converter DAC2 may have the same structure. However, the first digital-analog converter DAC1 and the second digital-analog converter DAC2 may have different configurations for receiving the timing signals TMS. For example, an order in which the first switches S1a to S32a are turned on may be different from that in which the second switches S1b to S32b are turned on. For example, a turn-on order of the first switches Sla to S32a and a turn-on order of the second switches S1b to S32b may be such that the first driving signal ISIN and the second driving signal OSIN are inverted to each other (see FIG. 15).

Referring to FIG. 16, a first buffer BF1, a first low pass filter LF1b, and a first amplifier AMP1b may be connected in series (or sequentially connected) to the output terminal of the first digital-analog converter DAC1.

An input terminal (for example, a non-inverting input terminal) of the first buffer BF1 may be connected to the output terminal of the first digital-analog converter DAC1. The first buffer BF1 may be an amplifier having a gain value of 1. The first buffer BF1 maintains an output such that the first driving signal ISIN is not attenuated.

An input terminal of the first low pass filter LF1b may be connected to an output terminal of the first buffer BF1. The first low pass filter LF1b may output a sinusoidal wave having a gentle curve by removing stepped high frequency components (see FIG. 15) of the first driving signal ISIN.

An input terminal (for example, a non-inverting input terminal) of the first amplifier AMP1b may be connected to an output terminal of the first low pass filter LF1b. A gain value of the first amplifier AMP1b may be greater than 1. The first amplifier AMP1b may output a corrected first driving signal ISIN' by increasing the magnitude of the sinusoidal wave to a desired value.

Similarly, a second buffer BF2, a second low pass filter LF2b, and a second amplifier AMP2b may be connected in series to the output terminal of the second digital analog converter DAC2.

An input terminal (for example, a non-inverting input terminal) of the second buffer BF2 may be connected to the output terminal of the second digital-analog converter DAC2. The second buffer BF2 may be an amplifier having a gain value of 1. The second buffer BF2 maintains an output such that the second driving signal OSIN is not attenuated.

An input terminal of the second low pass filter LF2b may be connected to an output terminal of the second buffer BF2. The second low pass filter LF2b may output a sinusoidal wave having a gentle curve by removing stepped high frequency components (see FIG. 15) of the second driving signal OSIN.

An input terminal (for example, a non-inverting input terminal) of the second amplifier AMP2b may be connected to an output terminal of the second low pass filter LF2b. A gain value of the second amplifier AMP2b may be greater than 1. The second amplifier AMP2b may output a corrected second driving signal OSIN' by increasing the magnitude of the sinusoidal wave to a desired value.

Figure 17:
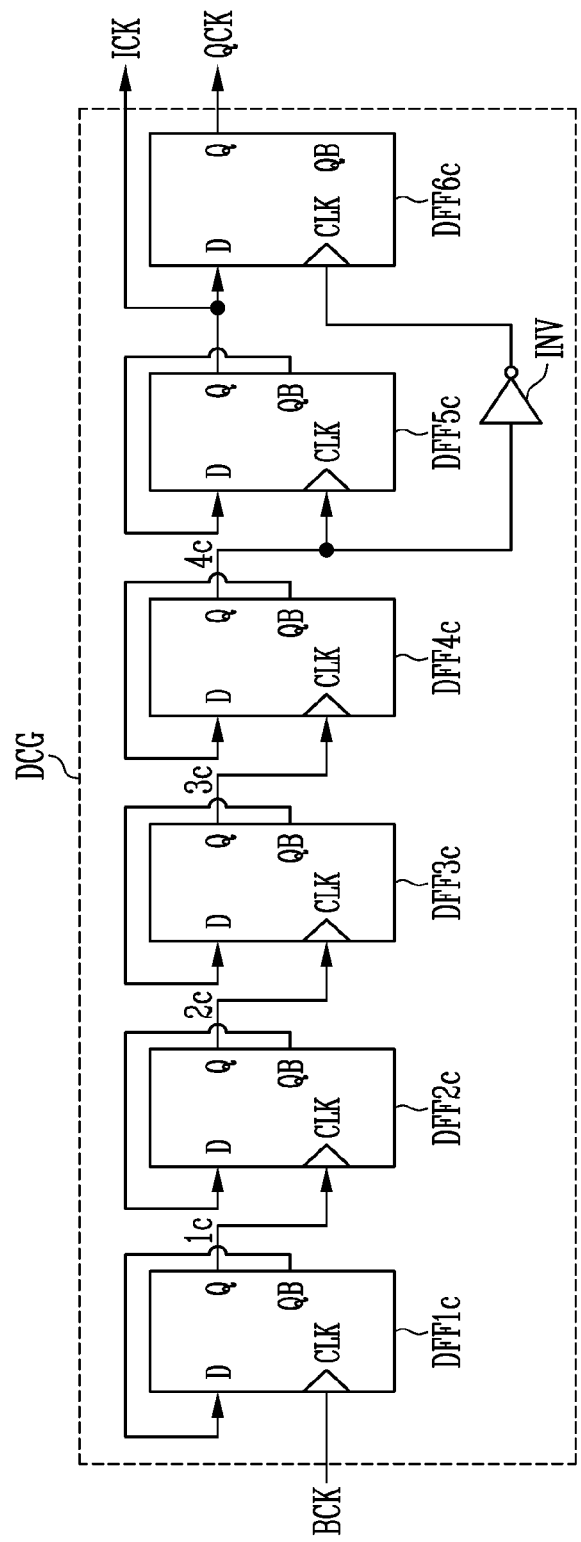
FIGS. 17 and 18 are schematic diagrams illustrating a demodulation clock generator in accordance with an embodiment.
Figure 18:
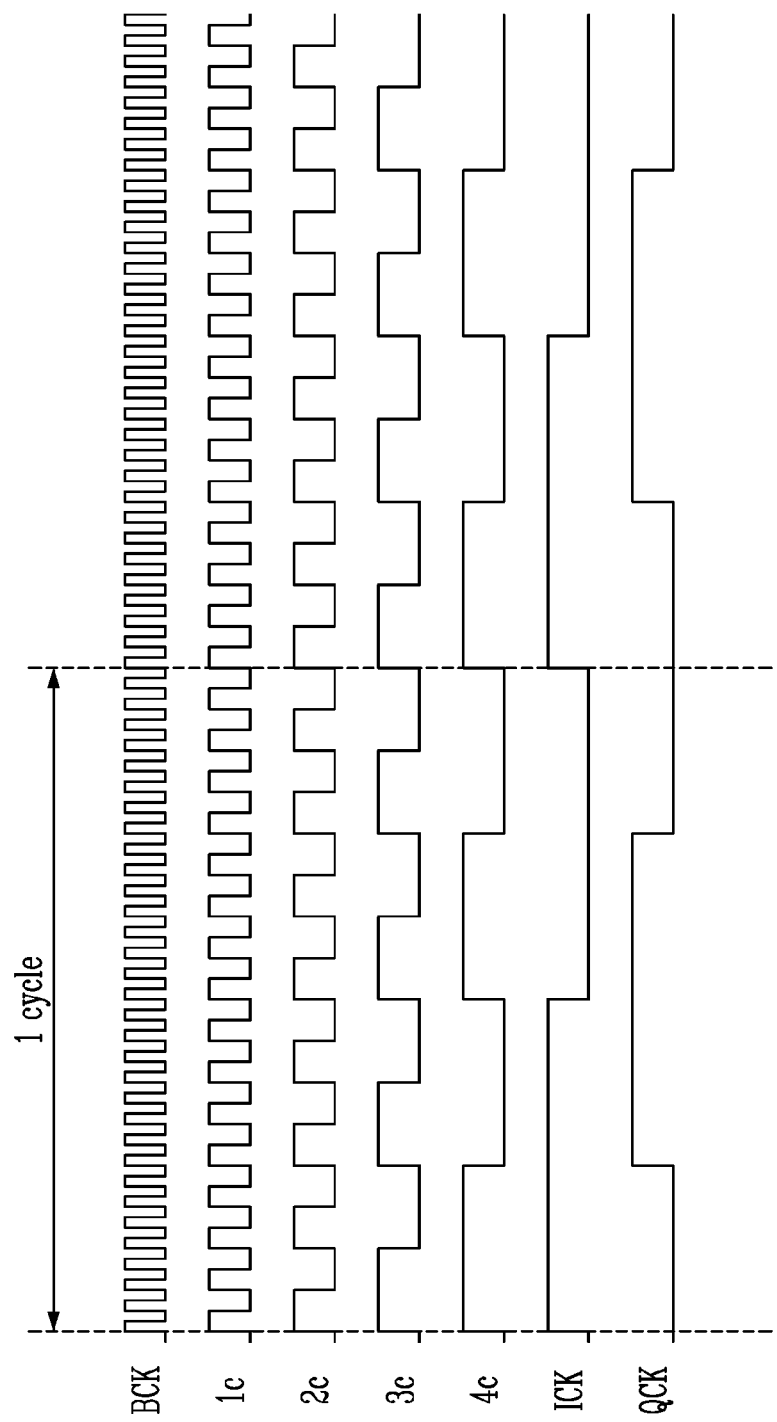

FIGS. 17 and 18 are schematic diagrams illustrating a demodulation clock generator in accordance with an embodiment.

Referring to FIG. 17, the demodulation clock generator DCG in accordance with an embodiment may include flip flops DFF1c, DFF2c, DFF3c, DFF4c, DFF5c, and DFF6c and an inverter INV. The flip flops DFF1c to DFF6c may be D flip flops. The demodulation clock generator DCG may be a frequency divider. A number of the flip flops DFF1c to DFF6c may be changed according to a frequency division level of the frequency divider.

A D input terminal of a first flip flop DFF1c may be connected to a QB output terminal of the first flip flop DFF1c. A clock input terminal CLK of the first flip flop DFF1c may receive the basic clock signal.

A D input terminal of a second flip flop DFF2c may be connected to a QB output terminal of the second flip flop DFF2c. A clock input terminal CLK of the second flip flop DFF2c may be connected to a Q output terminal of the first flip flop DFF1c.

A D input terminal of a third flip flop DFF3c may be connected to a QB output terminal of the third flip flop DFF3c. A clock input terminal CLK of the third flip flop DFF3c may be connected to a Q output terminal of the second flip flop DFF2c.

A D input terminal of a fourth flip flop DFF4c may be connected to a QB output terminal of the fourth flip flop DFF4c. A clock input terminal CLK of the fourth flip flop DFF4c may be connected to a Q output terminal of the third flip flop DFF3c.

A D input terminal of a fifth flip flop DFF5c may be connected to a QB output terminal of the fifth flip flop DFF5c. A clock input terminal CLK of the fifth flip flop DFF5c may be connected to a Q output terminal of the fourth flip flop DFF4c. A Q output terminal of the fifth flip flop DFF5c may output a first demodulation clock signal ICK.

An input terminal of the inverter INV may be connected to the Q output terminal of the fourth flip flop DFF4c. The inverter INV may invert and output an output signal 4c of the Q output terminal of the fourth flip flop DFF4c.

A D input terminal of a sixth flip flop DFF6c may be connected to the Q output terminal of the fifth flip flop DFF5c. A clock input terminal CLK of the sixth flip flop DFF6c may be connected to an output terminal of the inverter INV. A Q output terminal of the sixth flip flop DFF6c may output a second demodulation clock signal QCK.

Referring to FIG. 18, a simulation result is illustrated, in which an output signal 1c of the first flip flop DFF1c, an output signal 2c of the second flip flop DFF2c, an output signal 3c of the third flip flop DFF3c, the output signal 4c of the fourth flip flop DFF4c, the first demodulation clock signal ICK, and the second demodulation clock signal QCK are generated by sequentially frequency-dividing the basic clock signal BCK.

Figure 19:
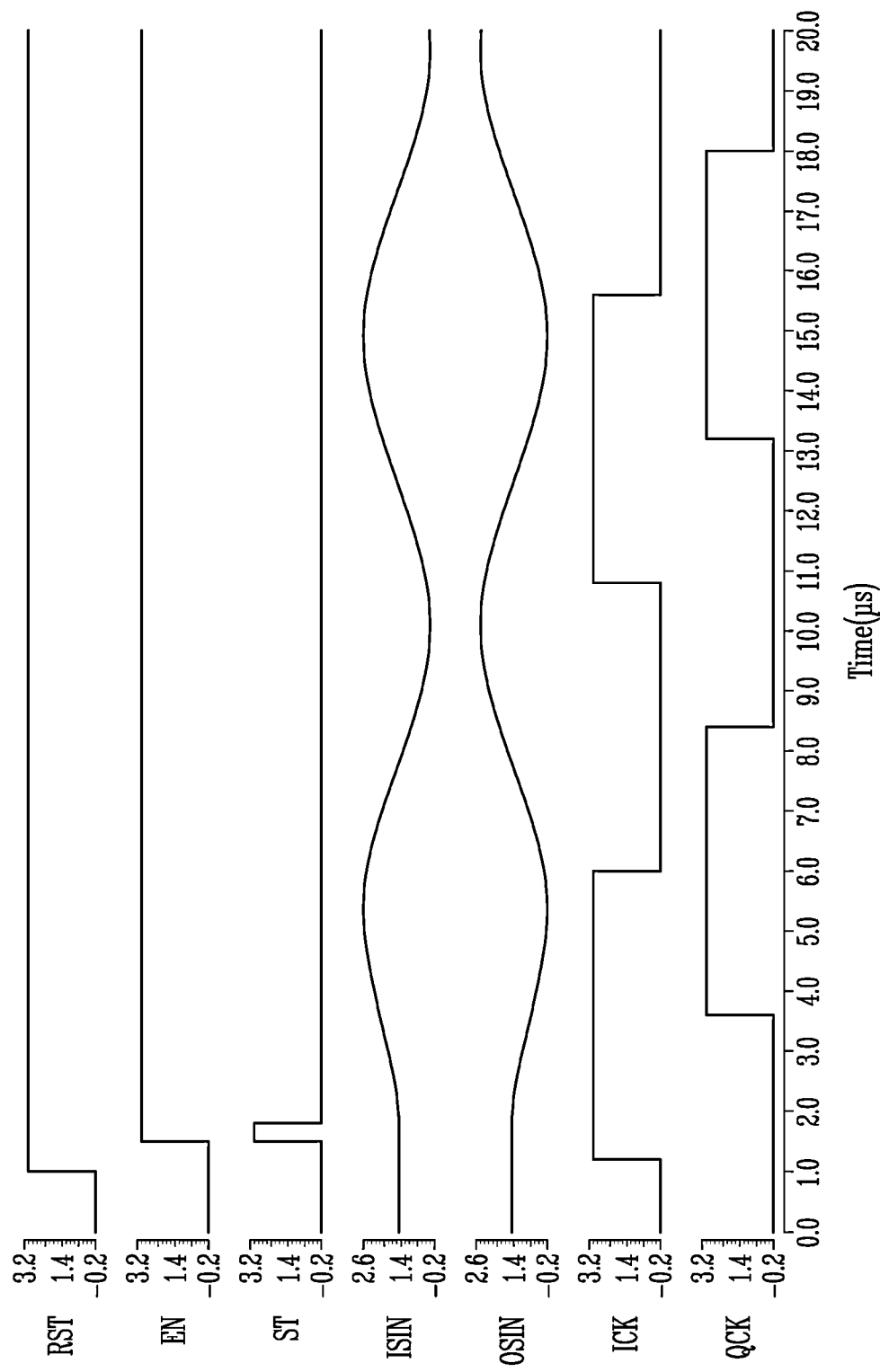
FIG. 19 is a schematic diagram illustrating a simulation result of a signal generator in accordance with an embodiment.

FIG. 19 is a schematic diagram illustrating a simulation result of a signal generator in accordance with an embodiment.

Referring to FIG. 19, a simulation result is illustrated, in which a start signal ST, a first driving signal ISIN, a second driving signal OSIN, a first demodulation clock signal ICK, and a second demodulation clock signal QCK are generated by receiving an enable signal EN from the outside of the signal generator SGN.

The display driver 210 (D-IC) may provide the signal generator SGN with an enable signal EN allowing generation of the driving signals ISIN and OSIN, regardless of the basic clock signal BCK. The level of the enable signal EN allowing generation of the driving signals ISIN and OSIN may be a logic high level.

In an embodiment, the display driver 210 (D-IC) may provide a reset signal RST to the signal generator SGN. The reset signal RST is a negative-on type reset signal, to allow the generation of the driving signals ISIN and OSIN in case that the reset signal RST has a logic high level. For example, the reset signal RST may be provided to the first flip flop DFF1a of the start signal generator STG (see FIG. 10). In an embodiment, the reset signal RST may be provided to all flip flops or some or a number of flip flops, which are described in this specification.

In the sensor device and the display device comprising the same in accordance with the disclosure, an internal clock signal is used, so that any additional logic circuit necessary for synchronization is unnecessary.

Example embodiments have been disclosed herein, and although terms are employed, they are used and are to be interpreted in a generic and descriptive sense only and not for purpose of limitation. In some instances, as would be apparent to one of ordinary skill in the art, features, characteristics, and/or elements described in connection with a given embodiment may be used singly or in combination with features, characteristics, and/or elements described in connection with other embodiments unless otherwise indicated. Accordingly, it will be understood by those of ordinary skill in the art that various changes in form and details may be made without departing from the spirit and scope of the disclosure as set forth in the following claims.

What is claimed is:

1. A sensor device comprising:
    first sensors;
    second sensors and the first sensors of mutual capacitance;
    a sensor transmitter electrically connected to the first sensors, the sensor transmitter supplying driving signals to the first sensors;
    a sensor receiver electrically connected to the second sensors, the sensor receiver receiving sensing signals from the second sensors, the sensor receiver demodulating the sensing signals by using demodulation clock signals; and
    a signal generator receiving an external enable signal, generating a basic clock signal, generating the driving signals to be synchronized with the basic clock signal and the external enable signal, and generating the demodulation clock signals to be synchronized with the basic clock signal.

2. The sensor device of claim 1, wherein the driving signals include a first driving signal and a second driving signal of a frequency equal to a frequency of the first driving signal and of a phase different from a phase of the first driving signal.

3. The sensor device of claim 2, wherein the signal generator includes:
    a basic clock generator generating the basic clock signal;
    a start signal generator generating a start signal to be synchronized with the basic clock signal and the external enable signal;
    a timing signal generator sequentially generating timing signals to be synchronized with the basic clock signal and the start signal;
    a first digital-analog converter generating the first driving signal, based on the timing signals; and
    a second digital-analog converter generating the second driving signal, based on the timing signals.

4. The sensor device of claim 3, wherein the basic clock generator includes:
    odd-numbered fully differential amplifiers electrically connected in series in a ring structure; and
    a comparator having input terminals respectively electrically connected to output terminals of one of the odd-numbered fully differential amplifiers, and an output terminal providing the basic clock signal.

5. The sensor device of claim 3, wherein the start signal generator includes:
    a first flip flop outputting a first logic signal, based on the enable signal and the basic clock signal;
    a second flip flop outputting a second logic signal, based on the first logic signal and the basic clock signal; and
    an XOR gate outputting the start signal by using the first logic signal and the second logic signal as inputs.

6. The sensor device of claim 3, wherein the timing signal generator includes:
    flip flops electrically connected in series, the flip flops outputting logic signals as the timing signals; and
    an OR gate having input terminals receiving the start signal and a logic signal of a last flip flop among the flip flops, and an output terminal electrically connected to an input terminal of a first flip flop among the flip flops.

7. The sensor device of claim 3, wherein
    the first digital-analog converter includes first switches electrically connected in parallel between an output terminal through which the first driving signal is output and a resistor string, the first switches being sequentially turned on according to the timing signals,
    the second digital-analog converter includes second switches electrically connected in parallel between an output terminal through which the second driving signal is output and a resistor string, the second switches being sequentially turned on according to the timing signals, and
    an order in which the first switches are turned on is different from an order in which the second switches are turned on.

8. The sensor device of claim 7, wherein the signal generator includes:
    a first buffer electrically connected to the output terminal of the first digital-analog converter;
    a first low pass filter electrically connected to an output terminal of the first buffer; and
    a first amplifier electrically connected to an output terminal of the first low pass filter.

9. The sensor device of claim 8, wherein the signal generator includes:
    a second buffer electrically connected to the output terminal of the second digital-analog converter;
    a second low pass filter electrically connected to an output terminal of the second buffer; and
    a second amplifier electrically connected to an output terminal of the second low pass filter.

10. A sensor device comprising:
    first sensors;
    second sensors and the first sensors of mutual capacitance;
    a sensor transmitter electrically connected to the first sensors, the sensor transmitter supplying driving signals to the first sensors;
    a sensor receiver electrically connected to the second sensors, the sensor receiver receiving sensing signals from the second sensors, the sensor receiver demodulating the sensing signals by using demodulation clock signals; and
    a signal generator generating a basic clock signal, and generating the driving signals and the demodulation clock signals to be synchronized with the basic clock signal, wherein
    the demodulation clock signals include a first demodulation clock signal and a second demodulation clock signal having a phase different by about 90 degrees from a phase of the first demodulation clock signal, and
    the signal generator includes a demodulation clock generator generating the first demodulation clock signal and the second demodulation clock signal to be synchronized with the basic clock signal.

11. The sensor device of claim 10, wherein the sensor receiver includes:
    a charge amplifier receiving the sensing signals from two of the second sensors;
    a band pass filter filtering an output signal of the charge amplifier to have a set frequency band;

a first demodulator demodulating an output signal of the band pass filter, based on the first demodulation clock signal; and a second demodulator demodulating the output signal of the band pass filter, based on the second demodulation clock signal.

12. The sensor device of claim 11, wherein the sensor receiver includes:

a first low pass filter filtering an output signal of the first demodulator to have a set frequency band; and a second low pass filter filtering an output signal of the second demodulator to have a set frequency band.

13. The sensor device of claim 12, wherein the set frequency band of the first low pass filter and the set frequency band of the second low pass filter are lower than the set frequency band of the band pass filter.

14. The sensor device of claim 13, wherein the sensor receiver includes:

a first analog-digital converter converting an output signal of the first low pass filter into a first digital signal; and a second analog-digital converter converting an output signal of the second low pas filter into a second digital signal.

15. The sensor device of claim 14, wherein the sensor receiver includes a signal processor determining a final sensing value by adding up a square value of the first digital signal and a square value of the second digital signal.

16. A display device comprising:

a display unit displaying an image;

a sensor unit overlapping the display unit, the sensor unit including first sensors and second sensors of mutual capacitance;

a sensor transmitter electrically connected to the first sensors, the sensor transmitter supplying driving signals to the first sensors;

a sensor receiver electrically connected to the second sensors, the sensor receiver receiving sensing signals from the second sensors, the sensor receiver demodulating the sensing signals by using demodulation clock signals;

a signal generator generating a basic clock signal, and generating the driving signals and the demodulation clock signals to be synchronized with the basic clock signal; and a display driver providing the signal generator with an enable signal allowing generation of the driving signals without the basic clock signal.

17. The display device of claim 16, wherein the driving signals include a first driving signal and a second driving signal of a frequency equal to a frequency of the first driving signal and a phase different from a phase of the first driving signal.

18. The display device of claim 17, wherein the signal generator includes:

a basic clock generator generating the basic clock signal;

a start signal generator generating a start signal to be synchronized with the basic clock signal and an external enable signal;

a timing signal generator sequentially generating timing signals to be synchronized with the basic clock signal and the start signal;

a first digital-analog converter generating the first driving signal, based on the timing signals; and a second digital-analog converter generating the second driving signal, based on the timing signals.

19. The display device of claim 16, wherein the demodulation clock signals include a first demodulation clock signal and a second demodulation clock signal having a phase different by about 90 degrees from a phase of the first demodulation clock signal, and the signal generator includes a demodulation clock generator generating the first demodulation clock signal and the second demodulation clock signal to be synchronized with the basic clock signal.

20. The display device of claim 19, wherein the sensor receiver includes:

a charge amplifier receiving the sensing signals from two of the second sensors;

a band pass filter filtering an output signal of the charge amplifier to have a set frequency band;

a first demodulator demodulating an output signal of the band pass filter, based on the first demodulation clock signal;

a second demodulator demodulating the output signal of the band pass filter, based on the second demodulation clock signal;

a first low pass filter filtering an output signal of the first demodulator to have a set frequency band;

a second low pass filter filtering an output signal of the second demodulator to have a set frequency band;

a first analog-digital converter converting an output signal of the first low pass filter into a first digital signal; and a second analog-digital converter converting an output signal of the second low pas filter into a second digital signal.

* * * * *